US012810742B2

(12) United States Patent
Allan et al.

(10) Patent No.: US 12,810,742 B2
(45) Date of Patent: Nov. 24, 2026

(54) METHOD AND SYSTEM OF PROPAGATED AIRSPACE RISK LEVEL ENCODING OF GROUND ATTRIBUTES

(71) Applicant: THE BOEING COMPANY, Arlington, VA (US)

(72) Inventors: Lachlan Allan, Brisbane (AU); Lochlann Bryce Andrews, Everton Park (AU); Jacob Lee Sainty, Brisbane (AU)

(73) Assignee: THE BOEING COMPANY, Arlington, VA (US)

( * ) Notice: Subject to any disclaimer, the term of this patent is extended or adjusted under 35 U.S.C. 154(b) by 73 days.

(21) Appl. No.: 18/644,620

(22) Filed: Apr. 24, 2024

(65) Prior Publication Data

US 2025/0336306 A1 Oct. 30, 2025

(51) Int. Cl.

| | |
|---|---|
| ***G08G 5/00*** | (2025.01) |
| ***B64D 45/00*** | (2006.01) |
| ***G01C 21/20*** | (2006.01) |
| ***G05D 1/02*** | (2020.01) |
| ***G05D 1/10*** | (2006.01) |
| ***G08G 5/32*** | (2025.01) |
| ***G08G 5/74*** | (2025.01) |

(52) U.S. Cl.
CPC ................ *G08G 5/74* (2025.01); *G08G 5/32* (2025.01)

(58) Field of Classification Search
None
See application file for complete search history.

(56) References Cited

U.S. PATENT DOCUMENTS

| | | | | |
|---|---|---|---|---|
| 9,417,070 | B1 * | 8/2016 | Herriot | G08G 5/55 |
| 9,542,849 | B1 * | 1/2017 | Bertram | G08G 5/55 |
| 2019/0103031 | A1 * | 4/2019 | Evans | G08G 5/59 |
| 2021/0225179 | A1 * | 7/2021 | Cleaver | G05D 1/101 |
| 2021/0312817 | A1 * | 10/2021 | Stewart | G08G 5/22 |
| 2021/0358310 | A1 * | 11/2021 | Sachs | G08G 5/22 |
| 2024/0212512 | A1 * | 6/2024 | Büddefeld | G08G 5/55 |

* cited by examiner

*Primary Examiner* — Adam D Tissot
*Assistant Examiner* — Michael T Silva
(74) *Attorney, Agent, or Firm* — Moore IP Law

(57) ABSTRACT

A device includes a processor configured to obtain ground risk data that indicates ground risk levels associated with portions of terrain under an airspace. The processor is further configured to generate airspace risk levels associated with portions of the airspace, the airspace risk levels based on the ground risk levels. The processor is further configured to provide an output to a second device, the output associated with a flight plan of an aircraft, where the flight plan indicates a flight path that traverses one or more of the portions of the airspace.

20 Claims, 12 Drawing Sheets

200D

METHOD AND SYSTEM OF PROPAGATED AIRSPACE RISK LEVEL ENCODING OF GROUND ATTRIBUTES

FIELD OF THE DISCLOSURE

The present disclosure is generally related to propagated airspace risk level encoding of ground attributes.

BACKGROUND

Accurately and efficiently navigating through an airspace requires a comprehensive understanding of the surrounding environment. This includes not only the immediate airspace but also the terrain and obstacles below. Encoding ground attributes into flight path planning algorithms plays a crucial role in ensuring safe and efficient aerial maneuvers. Previous flight path planning primarily relied on digital elevation models (DEMs) or pre-programmed waypoints. DEMs provide basic elevation data for the terrain, often represented as a grid of altitude values. However, DEMs lack details about other crucial ground attributes like vegetation, buildings, or power lines. Pre-programmed waypoints require pilots to manually define specific points through which an aircraft passes. However, this approach is inflexible and may not account for crucial types of ground attributes.

SUMMARY

In a particular implementation, a device includes a processor configured to obtain ground risk data that indicates ground risk levels associated with portions of terrain under an airspace. The processor is further configured to generate airspace risk levels associated with portions of the airspace. The airspace risk levels are based on the ground risk levels. The processor is further configured to provide an output to a second device, the output associated with a flight plan of an aircraft. The flight plan indicates a flight path that traverses one or more of the portions of the airspace.

In a particular implementation, a method includes obtaining, at a first device, ground risk data that indicates ground risk levels associated with portions of terrain under an airspace. The method includes generating, at the first device, airspace risk levels associated with portions of the airspace. The airspace risk levels are based on the ground risk levels. The method includes providing an output from the first device to a second device, the output associated with a flight plan of an aircraft. The flight plan indicates a flight path that traverses one or more of the portions of the airspace.

In another particular implementation, a non-transitory computer-readable medium stores instructions that, when executed by one or more processors, cause the one or more processors to obtain ground risk data that indicates ground risk levels associated with portions of terrain under an airspace. The instructions also cause the one or more processors to generate airspace risk levels associated with portions of the airspace, the airspace risk levels based on the ground risk levels. The instructions also cause the one or more processors to provide an output to a device, the output associated with a flight plan of an aircraft. The flight plan indicates a flight path that traverses one or more of the portions of the airspace.

The features, functions, and advantages described herein can be achieved independently in various implementations or may be combined in yet other implementations, further details of which can be found with reference to the following description and drawings.

DETAILED DESCRIPTION

Figure 1:
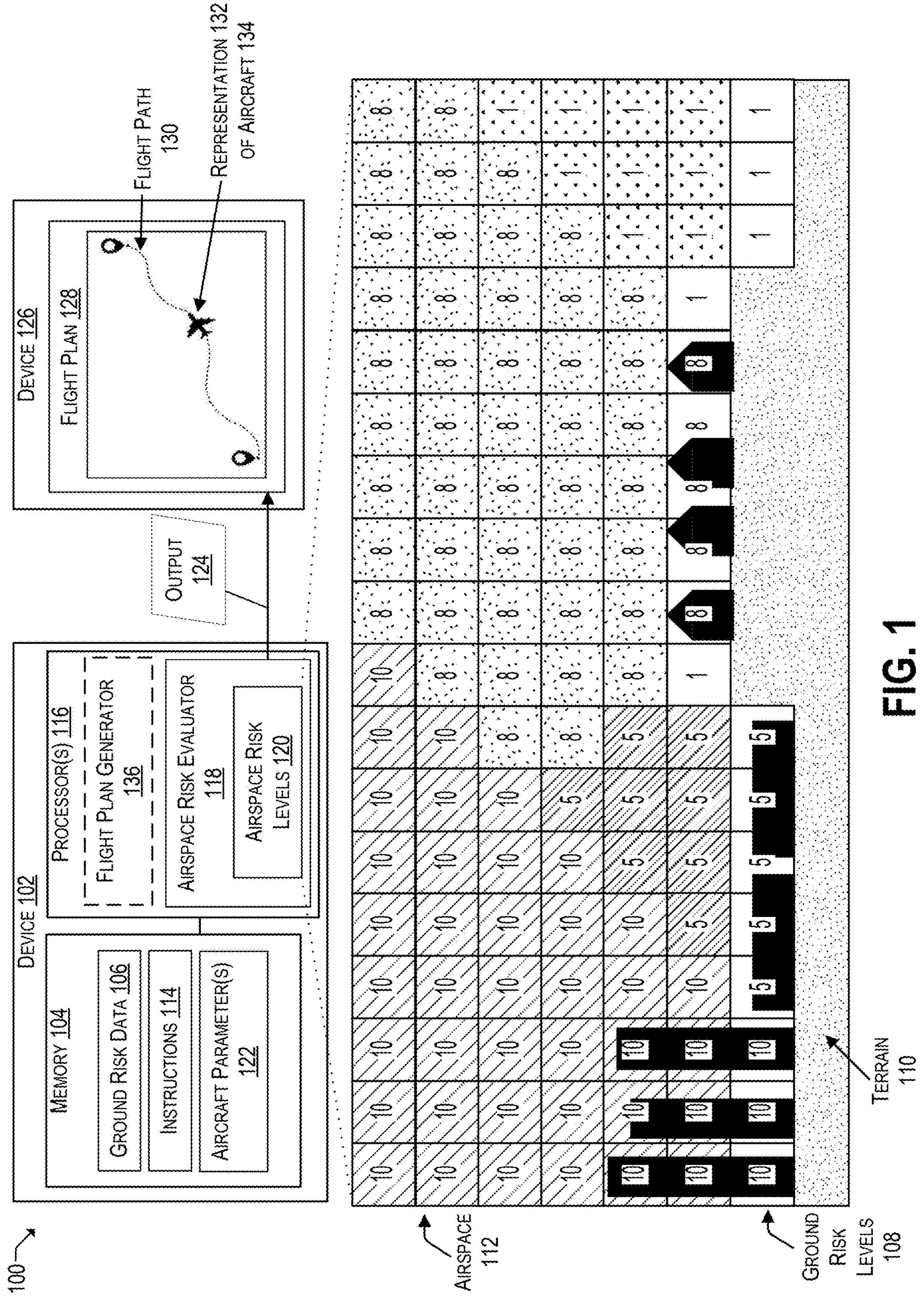
FIG. 1 depicts an example of a system configured to determine ground risk levels and airspace risk levels to provide a flight plan for an aircraft.

Flying safely and efficiently demands a detailed picture of the world beyond the cockpit. Beyond immediate airspace, understanding the terrain and obstacles below is critical. For smooth and secure aerial maneuvers, encoding ground features into flight planning algorithms is essential. Traditionally, flight paths relied on basic digital elevation models (DEMs) or pre-programmed waypoints. DEMs offer rudimentary terrain data, typically portrayed as grids of altitude values. However, they lack information about vital ground features like vegetation, buildings, or power lines. Pre-programmed waypoints require pilots to manually define flight paths. This method is rigid and does not account for some crucial types of ground attributes. For example, the DEMs do not account for impact of the aircraft (or a load of the aircraft) landing (e.g., falling) on the ground in an emergency. To illustrate, there is a greater inconvenience and risk of injuries if an unmanned aerial vehicle malfunctions and falls on a populated area, such as a playground.

Aspects disclosed herein present systems and methods for propagated airspace risk level encoding based on ground attributes. An airspace risk evaluator obtains ground risk data that indicates ground risk levels corresponding to ground attributes of portions of terrain under an airspace. The ground risk levels can account for relatively fixed attributes, such as obstacles, buildings, population, protected areas, etc. In some examples, the ground risk levels can account for dynamic attributes, such as weather, events, traffic, etc. In an example, the ground risk data indicates a first ground risk level of a first terrain portion, a second ground risk level of a second terrain portion, and so on. The airspace risk evaluator propagates risk levels (e.g., upwards, and outwards) from the terrain portions through a grid of airspace portions, considering factors such as aircraft parameters (e.g., a glide profile) of an aircraft. The airspace risk level of an airspace portion indicates a risk level of traversing through that airspace portion. In an example, the aircraft parameters (e.g., a glide profile) can indicate one or more ground portions that are within range of the aircraft from the airspace portion. To illustrate, the aircraft can glide to land at the one or more ground portions from the airspace portion, e.g., due to power loss or another malfunction. Propagating the ground risk levels through the airspace portions based on the aircraft parameters enables identifying an airspace risk level associated with the aircraft (or aircraft load) landing at one or more ground portions that are within range of the aircraft from the airspace portion. For example, an airspace portion has a higher risk level if a more populated ground portion is within range of the aircraft from the airspace portion. Based on the risk levels, the airspace risk evaluator generates an output associated with a flight plan of an aircraft. For example, the airspace risk evaluator provides data indicating the airspace risk levels to a flight plan generator that generates (or updates) a flight plan, based at least in part on the airspace risk levels. To illustrate, the flight plan indicates a flight path that traverses one or more of the portions of the airspace such that overall flight risk is reduced.

The techniques and systems described herein provide a technical advantage of capturing not just elevation but also diverse ground attributes, can enable real-time adaptation to changing conditions and dynamic obstacles in some implementations, and provide efficient flight plans with reduced risks.

The figures and the following description illustrate specific exemplary implementations. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific implementations or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 2A, multiple terrain portions are illustrated and associated with reference numbers 206A, 206B, 206C, 206D, and 206E. When referring to a particular one of these terrain portions, such as the terrain portion 206A, the distinguishing letter "A" is used. However, when referring to any arbitrary one of these terrain portions or to these terrain portions as a group, the reference number 206 is used without a distinguishing letter.

Figure 9:
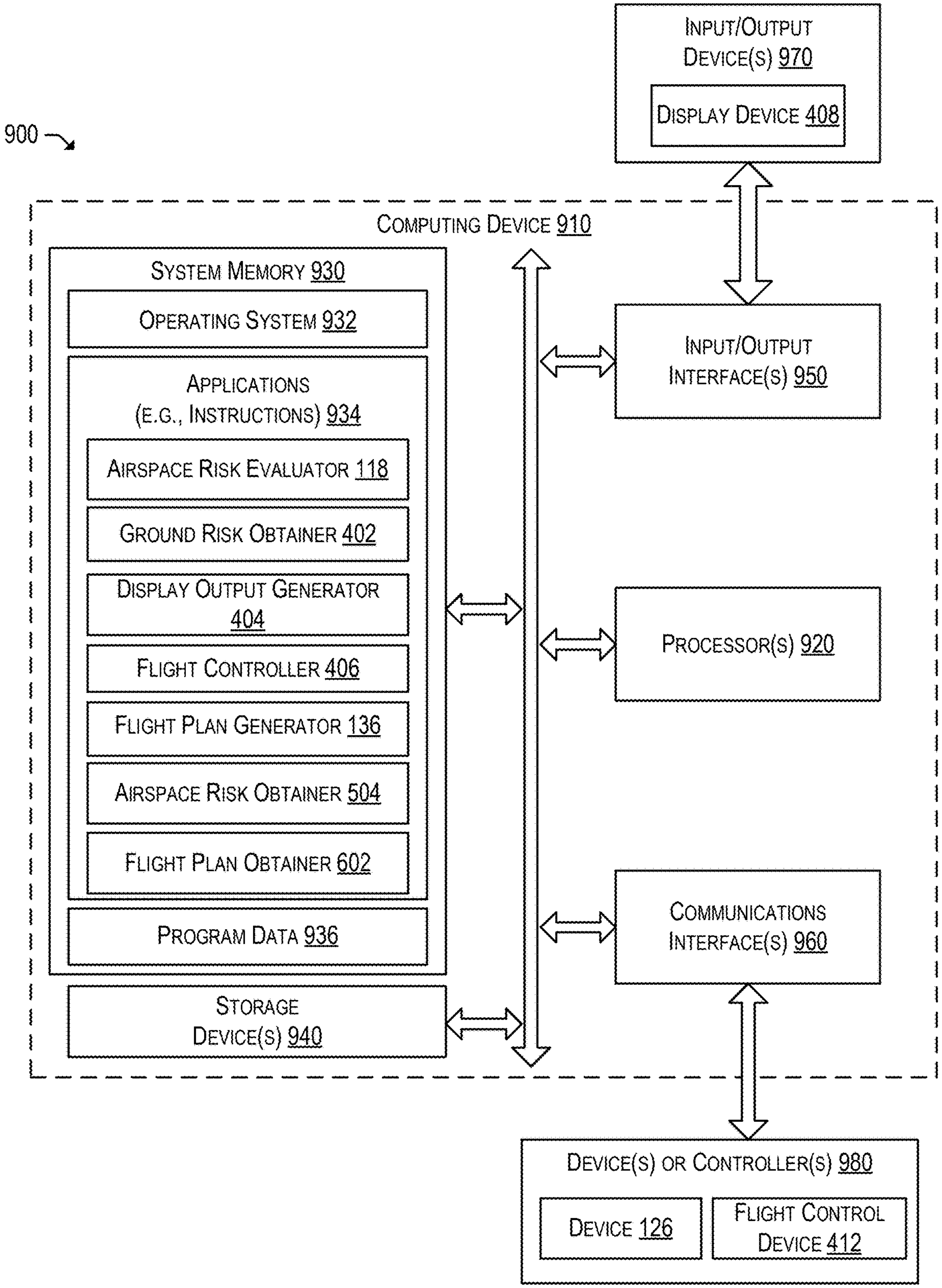
FIG. 9 is a block diagram of a computing environment including a computing device configured to support aspects of computer-implemented methods and computer-executable program instructions (or code) according to the present disclosure.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 9 depicts a computing device 910 including one or more processors ("processor(s)" 920 in FIG. 9), which indicates that in some implementations the computing device 910 includes a single processor 920 and in other implementations the computing device 910 includes multiple processors 920. For case of reference herein, such features are generally introduced as "one or more" features and are subsequently referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that is configured to determine ground risk levels 108 and airspace risk levels 120 to provide a flight plan 128 for an aircraft 134. The system 100 includes a device 102 coupled to a device 126. The device 102 includes a memory 104 coupled to one or more processors 116.

In a particular aspect, the device 102 can include, or be integrated in, at least one of the aircraft 134, a ground device, a tablet, a smart phone, a computer-based tool, a laptop computer, or an input accessory device. In some implementations, the aircraft 134 can include an unmanned aerial vehicle. The device 126 can include, or be integrated in, at least one of the aircraft 134, a ground device, a tablet, a smart phone, a computer-based tool, a laptop computer, or an input accessory device.

The processor(s) 116 include an airspace risk evaluator 118 that is configured to determine the ground risk levels 108 and the airspace risk levels 120 to generate an output 124 associated with the flight plan 128 for the aircraft 134. Optionally, in some implementations, the processor(s) 116 include a flight plan generator 136 configured to generate a flight plan 128 based at least in part on the airspace risk levels 120, as further described with reference to FIG. 3. The memory 104 includes a computer-readable medium (e.g., a computer-readable storage device) that stores instructions 114 that are executable by processor(s) 116. The instructions 114 are executable to initiate, perform, or control operations described herein with reference to the airspace risk evaluator 118. The memory 104 is configured to store data used or generated by the airspace risk evaluator 118. For example, the memory 104 is configured to store the ground risk data 106 indicating the ground risk levels 108, one or more aircraft parameters 122 of an aircraft 134, airspace risk levels 120 generated by the airspace risk evaluator 118, an output 124 generated by the processor(s) 116, a flight plan 128 generated by the flight plan generator 136, or a combination thereof.

During operation, the airspace risk evaluator 118 obtains ground risk data 106 that indicates ground risk levels 108 associated with portions of terrain 110 under an airspace 112, as further described with reference to FIG. 2A. For example, the airspace risk evaluator 118 obtains the ground risk data 106 in response to a user request to determine airspace risk levels 120. To illustrate, the airspace risk evaluator 118, in response to receiving a user input indicating a starting location (e.g., a source or a first way point) of a flight plan 128 and an end location (e.g., a destination or a second way point) of the flight plan 128, obtains the ground risk data 106 of the terrain 110 under the airspace 112 that is between the starting location and the end location.

In some implementations, the ground risk data 106 is based on user input, a configuration setting, default data, or a combination thereof. In some implementations, the airspace risk evaluator 118 receives the ground risk data 106, updates to the ground risk data 106, or both, from another device (e.g., a network device, a ground device, or both). In some implementations, the airspace risk evaluator 118 generates (e.g., updates) the ground risk data 106 based on detecting ground attributes.

In a particular aspect, the terrain 110 includes physical features of a geographic area (e.g., land, lakes, ponds, fields, mountains, etc.) under the airspace 112. For example, the physical features can include elevation, such as overall height and variation in height across the geographic area (e.g., flat, rolling hills, mountains, valleys), slope, such as, inclination of the land (e.g., gentle, steep, cliffs), aspects, such as, direction that the slope faces (e.g., north-facing, south-facing), vegetation (e.g., forest, grassland, desert, tundra), bodies of water (e.g., lakes, rivers, streams, ponds, or wetlands), coastal features (e.g., cliffs, beaches, tides, and marine life), and so forth. In some aspects, objects (e.g., manmade structures) are located on the terrain 110, such as residential buildings, commercial buildings, stadiums, roads, highways, and so forth. In the example illustrated in FIG. 1, the terrain 110 includes flat terrain and a hill that flattens out to flat terrain with commercial and residential buildings. In other implementations, the terrain 110 can include various physical features with various objects.

A ground risk level 108 of a particular portion of the terrain 110 can have a value on a scale from a first risk value (e.g., 1) to a second risk value (e.g., 10), with the first risk value representing a low ground risk level and the second risk value representing a high ground risk level. The ground risk level 108 of the particular portion of the terrain 110 can be based on relatively fixed ground attributes of the particular portion of the terrain 110, such as a geographic feature, an object, occupancy, population density, a weapon system location, restricted terrain categorization, and so forth. In some implementations, the ground risk level 108 of the portion of the terrain can be based on dynamic ground attributes, such as detected weather conditions, predicted weather conditions, a scheduled event, a detected event, detected ground traffic, predicted ground traffic, detected people, and so forth.

The airspace risk evaluator 118 obtains one or more aircraft parameters 122 of the aircraft 134 from another device, the memory 104, or both. For example, the airspace risk evaluator 118 obtains the aircraft parameter(s) 122 in response to determining that the user request indicates that airspace risk levels 120 are to be determined for the aircraft 134. In some implementations, the aircraft parameter(s) 122 are based on user input, a configuration setting, default data, data from another device, or a combination thereof. In some implementations, the airspace risk evaluator 118 receives the aircraft parameter(s) 122 from another device, such as a network device, a ground device, or both. In a particular aspect, the aircraft parameter(s) 122 indicates at least one of a glide profile, an aircraft size, a maximum impact range, a maximum takeoff weight, a payload capacity, a payload type, a cruise speed, a stall speed, a range, an endurance, a rate of climb, a landing distance, operating temperature and altitude limitations, a ceiling, or a service ceiling.

The airspace risk evaluator 118 generates airspace risk levels 120 associated with portions of the airspace 112 based on the ground risk levels 108 and the aircraft parameter(s) 122. For example, the airspace risk evaluator 118 selects, based on the aircraft parameter(s) 122, one or more portions of the terrain 110 that are below a portion of the airspace 112 and determines an airspace risk level 120 of the portion of the airspace 112 based on ground risk level(s) 108 of the selected portion(s) of the terrain 110, as further described with reference to FIG. 2B. The airspace risk evaluator 118 generates airspace risk levels 120 associated with higher portions of the airspace 112 based on the aircraft parameter (s) 122 and airspace risk levels 120 associated with lower portions of the airspace 112, as further described with reference to FIG. 2C. The ground risk levels 108 are thus propagated up to determine the airspace risk levels 120.

The airspace risk evaluator 118 provides the airspace risk levels 120 to a flight plan generator 136. The flight plan generator 136 generates a flight plan 128 based at least in part on the airspace risk levels 120 including a flight path 130 that traverses one or more portions of the airspace 112 from the starting location to the end location of the flight plan 128, as further described with reference to FIG. 3. For example, the flight path 130 traverses airspace portions that have an airspace risk level below a risk level threshold (e.g., 6), while avoiding airspace portions that have an airspace risk level greater than the risk level threshold.

The device 102 generates an output 124 based on the airspace risk levels 120 and provides the output 124 to the device 126, as further described with reference to FIGS. 4-7. In a first example, the device 102 includes the flight plan generator 136 and the device 126 includes a display device, as further described with reference to FIGS. 4 and 7. In the first example, the output 124 can include a display output provided to the display device to display a representation 132 of the aircraft 134 along the flight path 130 of the flight plan 128. In a second example, the device 102 includes the flight plan generator 136 and the device 126 includes a flight control device, as further described with reference to FIGS. 4 and 7. In the second example, the output 124 can include a flight control signal to the flight control device to maneuver the aircraft 134 along the flight path 130.

In a third example, the device 126 is integrated in the aircraft 134 and includes the flight plan generator 136, as further described with reference to FIG. 5. In the third example, the output 124 can include the airspace risk levels 120 that are used by the aircraft 134 to determine the flight path 130. In a fourth example, a ground device includes the flight plan generator 136 and the aircraft 134 includes the device 126, as further described with reference to FIG. 6. In the fourth example, the output 124 can include the flight plan 128 that is used by the aircraft 134 to navigate according to the flight path 130.

A technical advantage of using the system 100 includes efficiently determining the airspace risk levels 120 that consider the ground risk levels 108 associated with various ground attributes of the terrain 110. The airspace risk levels 120 can be used to quickly determine low risk flight plans.

Figure 2A:
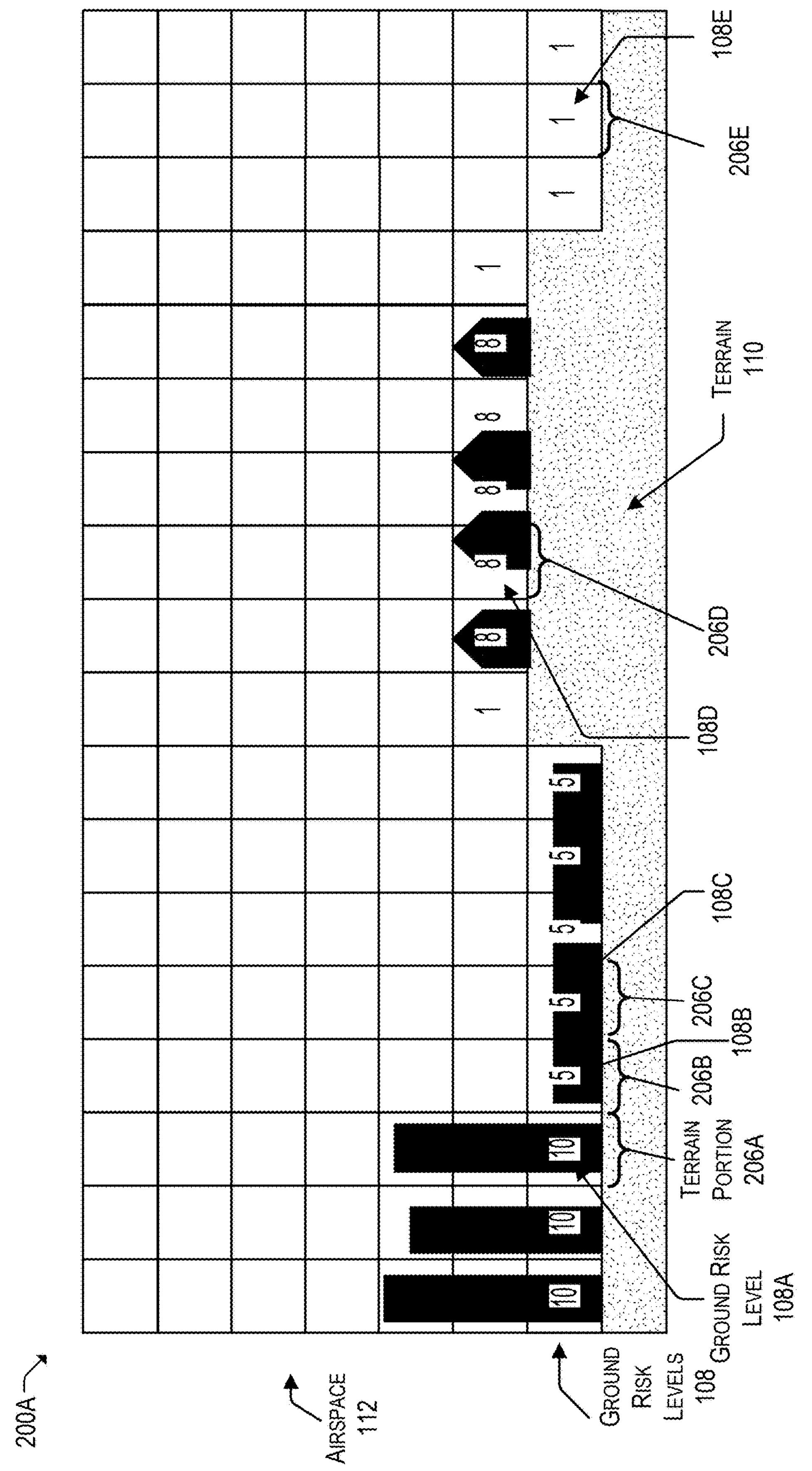
FIG. 2A is a diagram of an illustrative example of determining ground risk levels that may be performed by the system of FIG. 1.
Figure 2B:
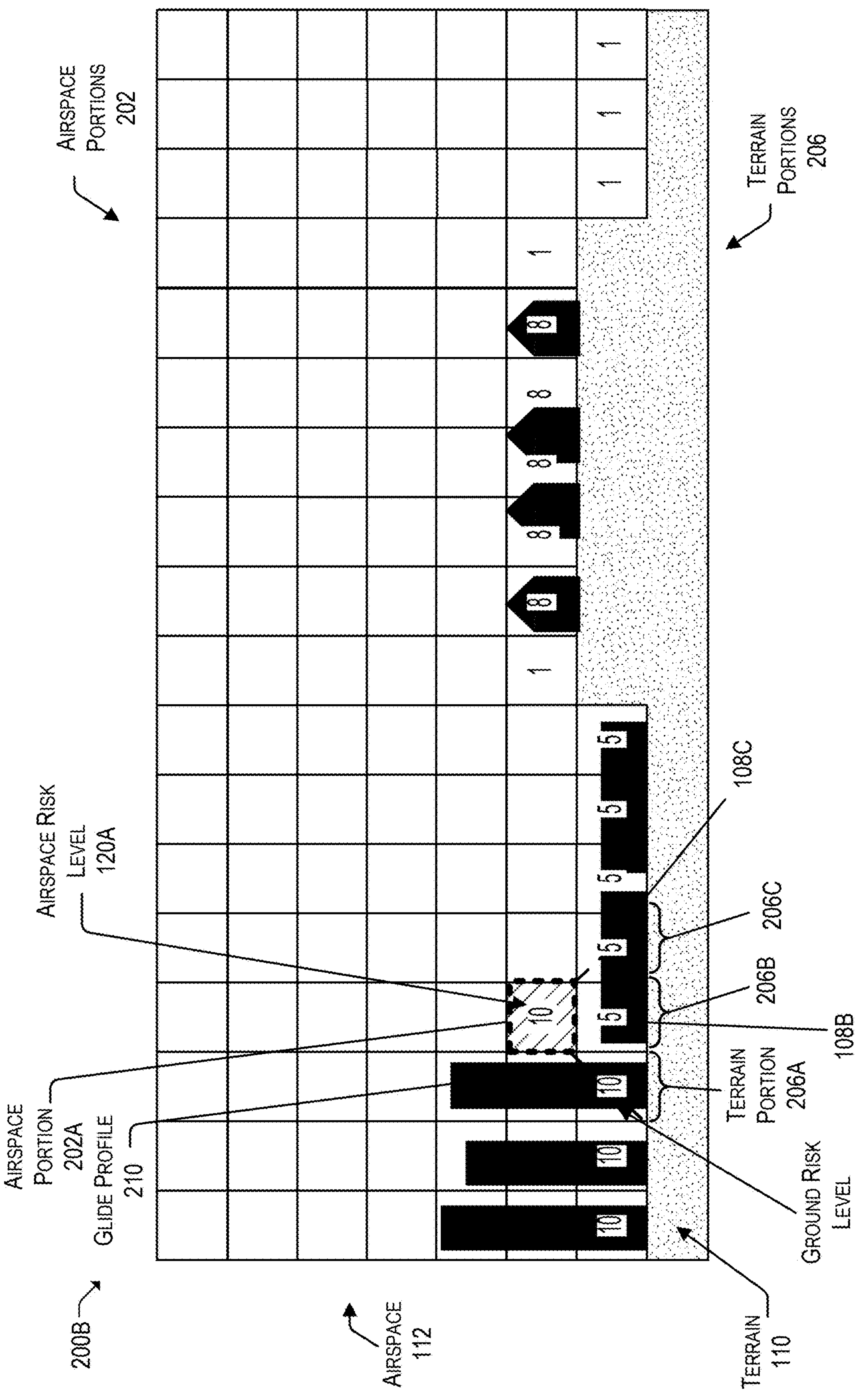
FIG. 2B is a diagram of an illustrative example of determining airspace risk levels based on one or more ground risk levels that may be performed by the system of FIG. 1.
Figure 2C:
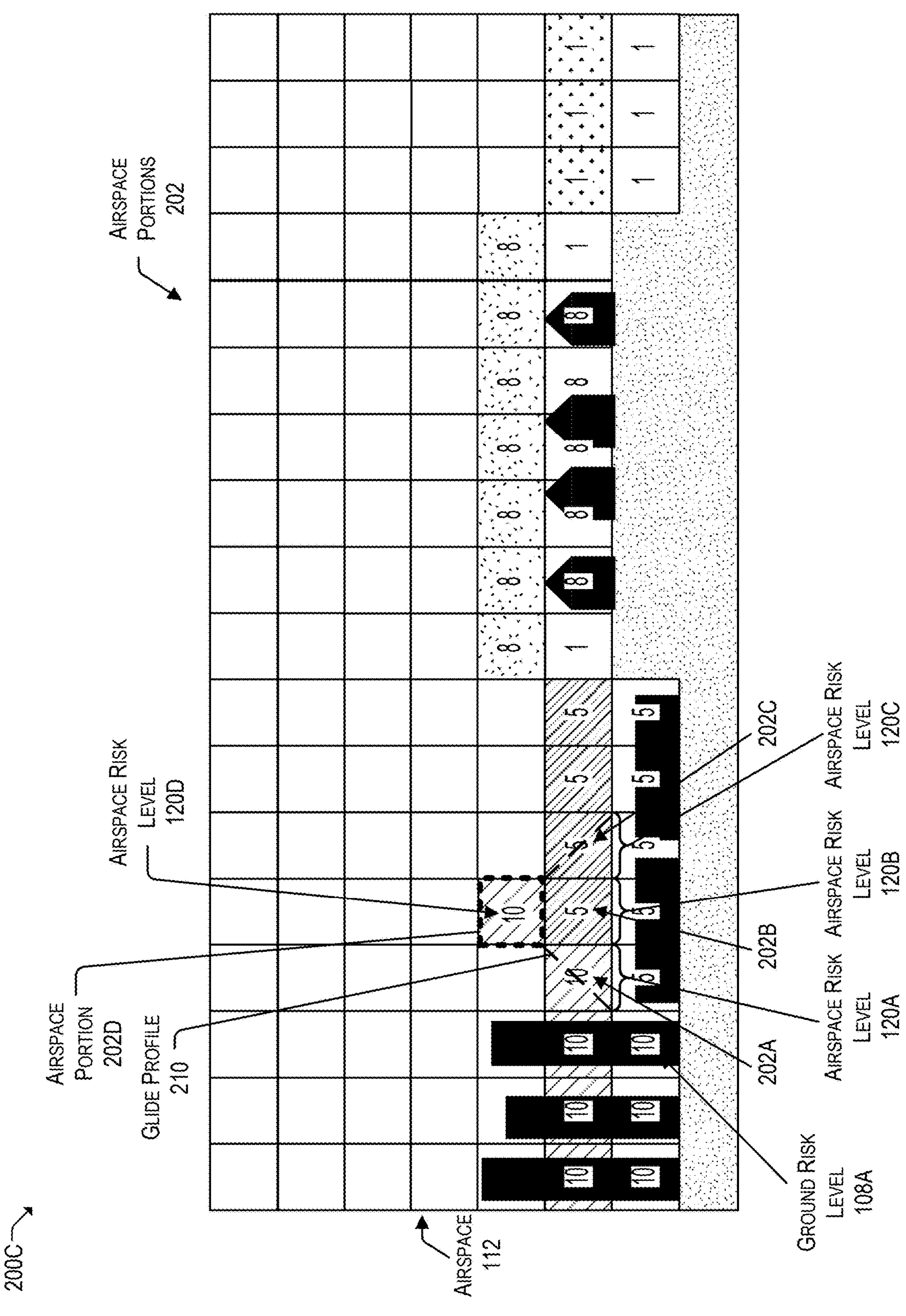
FIG. 2C is a diagram of an illustrative example of determining airspace risk levels based on one or more other airspace risk levels that may be performed by the system of FIG. 1.
Figure 2D:
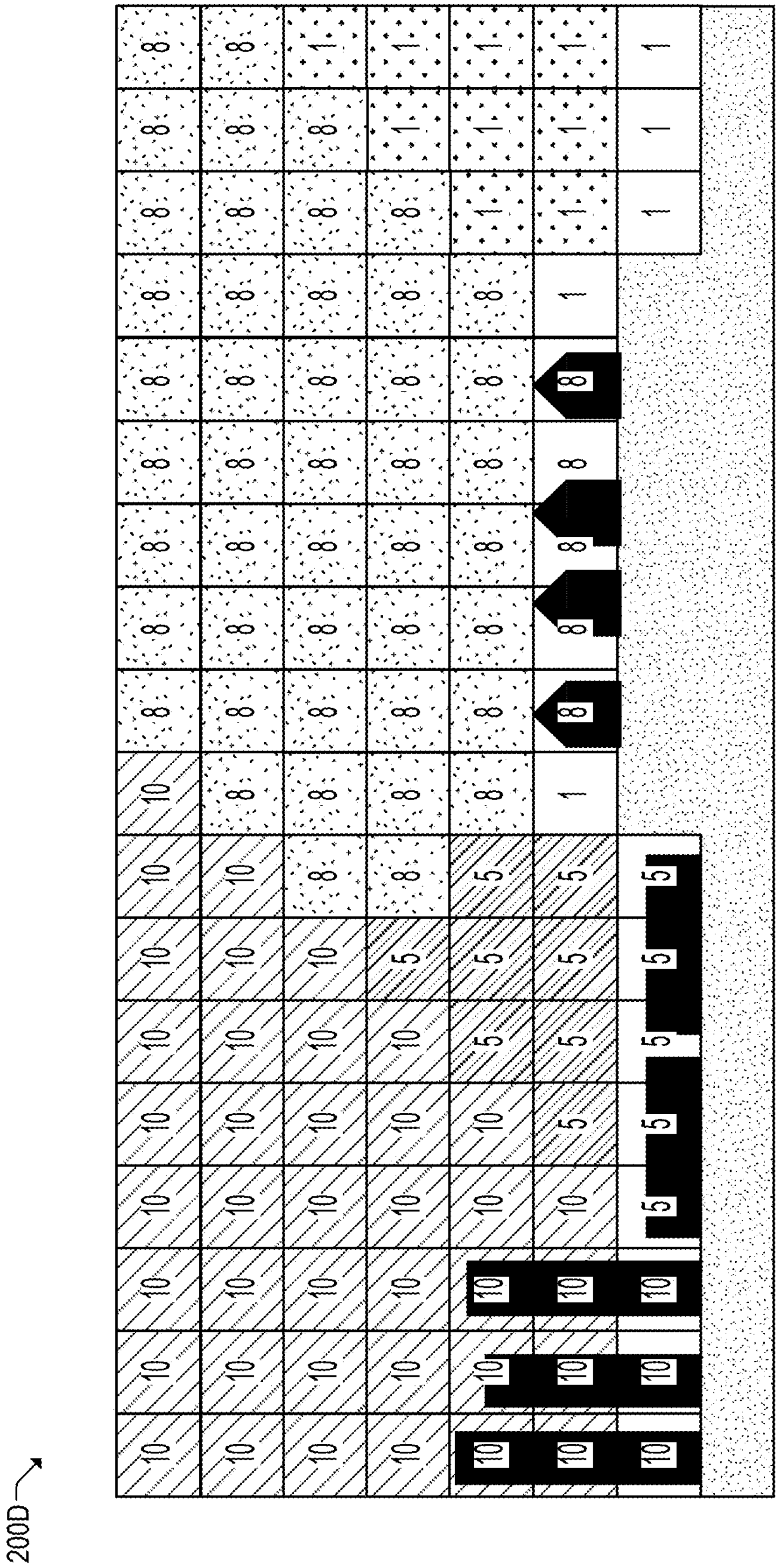
FIG. 2D is a diagram of an illustrative example of determining ground risk levels and airspace risk levels that may be performed by the system of FIG. 1.

FIGS. 2A-2D provide an illustrative example of determining the airspace risk levels 120 that may be performed by the airspace risk evaluator 118 of FIG. 1. FIG. 2A provides an example of obtaining the ground risk levels 108. FIG. 2B provides an example of propagating the ground risk levels 108 to one or more portions of the airspace 112 that are directly above the terrain 110. FIG. 2C provides an example of propagating airspace risk levels 120 from lower portions of the airspace 112 to higher portions of the airspace 112. FIG. 2D provides an example of risk levels propagated throughout the airspace 112.

FIG. 2A is a diagram 200A of an illustrative example of determining ground risk levels 108 that may be performed by the system 100 of FIG. 1. In a particular aspect, one or more operations described with reference to FIG. 2A may be performed by the airspace risk evaluator 118, the processor (s) 116, the device 102, the system 100 of FIG. 1, or a combination thereof.

The airspace risk evaluator 118 obtains ground risk data 106 that indicates ground risk levels 108 associated with terrain portions 206 of the terrain 110 under the airspace 112. A ground risk level 108 of a terrain portion 206 is based on ground attributes of the terrain portion 206. In some aspects, the ground risk level 108 is based on relatively fixed ground attributes, such as a geographic feature, an object, occupancy, population density, a weapon system location, restricted terrain categorization, and so forth, of the terrain portion 206. For example, a terrain portion 206A can have a ground risk level 108A (e.g., 10) that indicates a high risk because a high occupancy structure (e.g., an apartment building) is at least partially located on the terrain portion 206A. As another example, a terrain portion 206B and a terrain portion 206C can have a ground risk level 108B (e.g., 5) and a ground risk level 108C (e.g., 5), respectively, indicating a medium risk because a medium occupancy structure (e.g., a commercial storage facility) is at least partially located on each of the terrain portion 206B and the terrain portion 206C. In an example, a terrain portion 206D can have a ground risk level 108D (e.g., 8) indicating a medium-high risk because a single-family residential building (e.g., a house) is at least partially located thereon. In an example, a terrain portion 206E can have a ground risk level 108E (e.g., 1) indicating a low risk because the terrain portion 206E is associated with low occupancy (e.g., an open field).

In some implementations, a ground risk level 108 can be based at least in part on dynamic ground attributes, such as detected weather conditions, predicted weather conditions, a scheduled event, a detected event, detected ground traffic, predicted ground traffic, detected people, and so forth. In some aspects, a ground risk level 108 can dynamically change based on a time (e.g., time of day, day of the week, or both) and a type of the object located on a corresponding terrain portion 206. For example, an office building located on the terrain portion 206A can have higher occupancy during business hours (e.g., 8 am to 6 pm Monday through Friday). In this example, the ground risk data 106 can indicate that the terrain portion 206A has a first ground risk level 108A (e.g., 10) indicating higher risk during business hours and has a second ground risk level 108A (e.g., 3) indicating lower risk outside business hours.

In some aspects, a ground risk level 108 of a terrain portion 206 can dynamically change based on event information and the time and/or day. For example, the terrain portion 206E can have a first ground risk level 108E (e.g., 1) indicating a lower risk when no event is scheduled at or near the terrain portion 206E, and have a second ground risk level 108E (e.g., 8) indicating a higher risk at a particular time and day based on event information indicating that an event (e.g., a festival) is scheduled to occur at that particular time and day.

In some aspects, a ground risk level 108 of a terrain portion 206 can dynamically change based on a detected condition. For example, the terrain portion 206E can have a first ground risk level 108E (e.g., 1) indicating a lower risk when no people are detected on or near the terrain portion 206E, and have a second ground risk level 108E (e.g., 10) indicating a higher risk when at least one person is detected at or near the terrain portion 206E.

It should be understood that particular ground attributes and particular ground risk values are provided as illustrative examples, in other examples one or more of the terrain portions 206 can have various ground attributes and corresponding ground risk levels 108. For example, a ground risk level 108 can dynamically change based on changing ground attributes, such as occupancy, presence of an object, population density, weapon system locations, restricted terrain, detected weather conditions, predicted weather conditions, detected airspace traffic, predicted airspace traffic, scheduled events, detected ground traffic, predicted ground traffic, and so forth.

In some implementations, the airspace risk evaluator 118 updates the ground risk data 106 based on detecting a particular condition. In some implementations, the airspace risk evaluator 118 receives detected condition data from another device and updates the ground risk data 106 based on the detected condition data. In some implementations, the airspace risk evaluator 118 receives updates to the ground risk data 106 corresponding to the detected conditions.

FIG. 2B is a diagram 200B of an illustrative example of determining airspace risk levels 120 based on one or more ground risk levels 108 that may be performed by the system 100 of FIG. 1. In a particular aspect, one or more operations described with reference to FIG. 2B may be performed by the airspace risk evaluator 118, the processor(s) 116, the device 102, the system 100 of FIG. 1, or a combination thereof.

The airspace risk evaluator 118 generates airspace risk levels 120 of airspace portions 202 that are directly above a terrain portion 206. For example, the airspace risk evaluator 118 generates an airspace risk level 120 of an airspace portion 202 of the airspace 112 based on at least ground risk levels 108 of one or more terrain portions 206 of the terrain 110. In some aspects, the one or more terrain portions 206 selected to generate the airspace risk level 120 can be based on the aircraft parameter 122 of the aircraft 134. In some implementations, the aircraft parameter 122 can include a glide profile 210 of the aircraft 134. In a particular aspect, the glide profile 210 indicates a ratio that represents the distance the aircraft 134 can travel horizontally for every unit of altitude it loses during unpowered flight.

The airspace risk evaluator 118 selects a terrain portion 206B that is directly under an airspace portion 202A and optionally selects one or more additional terrain portions 206 on one or either side of the terrain portion 206B based on the one or more aircraft parameters 122. In an example, the airspace risk evaluator 118 determines that the aircraft parameter 122 (e.g., the glide profile 210) indicates that one or more particular terrain portions 206 (e.g., a terrain portion 206A, a terrain portion 206B, and a terrain portion 206C) are likely to be within a landing range of the aircraft 134 from the airspace portion 202A. As an example, the airspace risk evaluator 118 determines a landing range of the aircraft 134 based on the glide profile 210 (e.g., 45 degrees) that can be based on one or more aircraft parameters 122 that indicate at least one of weight, lift, drag, or thrust characteristics of the aircraft 134.

The airspace risk evaluator 118 determines an airspace risk level 120A of the airspace portion 202A based on one or more ground risk levels 108 of the one or more selected terrain portions 206. For example, the airspace risk evaluator 118 determines the airspace risk level 120A based on a representative risk value (e.g., a maximum risk value or an average risk) of the ground risk level 108A of the terrain portion 206A, the ground risk level 108B of the terrain portion 206B, and the ground risk level 108C of the terrain portion 206C. To illustrate, the airspace risk evaluator 118, in response to determining that the ground risk level 108A (e.g., 10) indicates a highest risk value among the ground risk levels 108A, 108B, and 108C of the selected terrain portions 206A, 206B, and 206C, designates the ground risk level 108A (e.g., 10) as the airspace risk level 120A of the airspace portion 202A. In the example illustrated in FIG. 2B, the higher ground risk level 108A (e.g., 10) thus gets propagated upward and outward from the terrain portion 206A to the airspace portion 202A as the airspace risk level 120A.

In some implementations, a ground risk level 108 can be associated with dynamic ground attributes, as described with reference to FIG. 2A. For example, the airspace risk evaluator 118 can update a ground risk level 108 based on detected weather conditions, predicted weather conditions, a scheduled event, a detected event, detected ground traffic, predicted ground traffic, detected people, and so forth. In some aspects, a ground risk level 108 can dynamically change based on a time (e.g., time of day, day of the week, or both) and a type of the object located on a corresponding terrain portion 206. For example, an office building located on the terrain portion 206A can have higher occupancy during business hours (e.g., 8 am to 6 pm Monday through Friday). In this example, the ground risk data 106 can indicate that the terrain portion 206A has a first ground risk level 108A (e.g., 10) indicating higher risk during business hours and has a second ground risk level 108A (e.g., 3) indicating lower risk outside business hours. Continuing this example, during the time when the second ground risk level 108A (e.g., 3) indicates a lower risk outside of business hours, the airspace risk evaluator 118 can designate the airspace portion 202A as having an airspace risk level 120A (e.g., 5) that corresponds to a representative risk value (e.g., a maximum risk value) of the ground risk levels 108A (e.g., 3), 108B (e.g., 5), and 108C (e.g., 5) of the three selected terrain portions 206A, 206B, and 206C. The airspace risk evaluator 118 can thus efficiently update one or more of the airspace risk levels 120 that correspond to an updated ground risk level 108. It should be understood that particular ground attributes, particular ground risk values, and particular airspace risk values are provided as illustrative examples, in other examples one or more of the terrain portions 206 can have various dynamic ground attributes and corresponding dynamic ground risk levels 108 thus changing the corresponding airspace risk levels 120. For example, the airspace risk evaluator 118 can update an airspace risk level 120 based on a ground risk level 108 that dynamically changes based on changing ground attributes, such as occupancy, presence of an object, population density, weapon system locations, restricted terrain, detected weather conditions, predicted weather conditions, detected airspace traffic, predicted airspace traffic, scheduled events, detected ground traffic, predicted ground traffic, and so forth.

It should be understood that selecting three terrain portions 206 to determine an airspace risk level 120 is provided as an illustrative example, in other examples the airspace risk evaluator 118 can select fewer than three or more than three terrain portions 206 based on one or more aircraft parameters 122. The airspace risk evaluator 118 continues to determine airspace risk levels 120 of one or more additional airspace portions 202 based on ground risk levels 108 of corresponding selected terrain portions 206.

In a particular aspect, an airspace portion 202 corresponds to a three-dimensional volume (e.g., a voxel) of the airspace 112. It should be understood that an airspace portion 202 is shown in FIGS. 2A-2D as having a square cross-section as an illustrative example, in other examples an airspace portion 202 can have any shape.

FIG. 2C is a diagram 200C of an illustrative example of determining airspace risk levels 120 based on one or more other airspace risk levels 120 that may be performed by the system 100 of FIG. 1. In a particular aspect, one or more operations described with reference to FIG. 2C may be performed by the airspace risk evaluator 118, the processor (s) 116, the device 102, the system 100 of FIG. 1, or a combination thereof.

The airspace risk evaluator 118 generates airspace risk levels 120 of airspace portions 202 that are directly above another airspace portion 202. For example, the airspace risk evaluator 118 generates an airspace risk level 120D of an airspace portion 202D of the airspace 112 based on at least airspace risk levels 120 of one or more other airspace portions 202 that are lower than the airspace portion 202D in the airspace 112. In some aspects, the one or more other airspace portions 202 to generate the airspace risk level 120D can be selected based on the aircraft parameter 122 of the aircraft 134. In some implementations, the aircraft parameter 122 can include the glide profile 210 of the aircraft 134.

The airspace risk evaluator 118 selects an airspace portion 202B that is directly under an airspace portion 202D and optionally selects one or more additional airspace portions 202 on one or either side of the airspace portion 202B based on the one or more aircraft parameters 122. In an example, the airspace risk evaluator 118 determines that the aircraft parameter 122 (e.g., the glide profile 210) indicates that one or more particular airspace portions 202 (e.g., an airspace portion 202A, an airspace portion 202B, and an airspace portion 202C) are likely to be within a range of the aircraft 134 during unpowered flight from the airspace portion 202D. As an example, the airspace risk evaluator 118 determines a range of the aircraft 134 based on the glide profile 210 (e.g., 45 degrees).

The airspace risk evaluator 118 determines an airspace risk level 120D of the airspace portion 202D based on one or more airspace risk levels 120 of the one or more selected airspace portions 202. For example, the airspace risk evaluator 118 determines the airspace risk level 120D based on a representative risk value (e.g., a maximum risk value or an average risk) of the airspace risk level 120A of the airspace portion 202A, the airspace risk level 120B of the airspace portion 202B, and the airspace risk level 120C of the airspace portion 202C. To illustrate, the airspace risk evaluator 118, in response to determining that the airspace risk level 120A (e.g., 10) indicates a highest risk value among the airspace risk levels 120A, 120B, and 120C of the selected airspace portions 202A, 202B, and 202C, designates the airspace risk level 120A (e.g., 10) as the airspace risk level 120D of the airspace portion 202D. In the example illustrated in FIG. 2C, the higher ground risk level 108A thus gets propagated upward and outward from the terrain portion 206A to the airspace portion 202A as the airspace risk level 120A and from the airspace portion 202A to the airspace portion 202D as the airspace risk level 120D.

It should be understood that particular ground attributes, particular ground risk values, and particular airspace risk values are provided as illustrative examples, in other examples one or more of the terrain portions 206 can have various dynamic ground attributes and corresponding dynamic ground risk levels 108 thus changing the corresponding airspace risk levels 120. For example, the airspace risk evaluator 118 can propagate a change in a ground risk level 108 of a terrain portion 206 by updating airspace risk levels 120 of corresponding airspace portions 202 based on the aircraft parameter 122.

It should be understood that selecting three airspace portions 202 to determine an airspace risk level 120 is provided as an illustrative example, in other examples the airspace risk evaluator 118 can select fewer than three or more than three airspace portions 202 based on one or more aircraft parameters 122. The airspace risk evaluator 118 continues to determine airspace risk levels 120 of one or more additional airspace portions 202 based on airspace risk levels 120 of corresponding selected airspace portions 202.

FIG. 2D is a diagram 200D of an illustrative example of determining ground risk levels 108 and airspace risk levels 120 that may be performed by the system 100 of FIG. 1. In a particular aspect, one or more operations described with reference to FIG. 2D may be performed by the airspace risk evaluator 118, the processor(s) 116, the device 102, the system 100 of FIG. 1, or a combination thereof. As illustrated in FIG. 2D, the ground risk levels 108 that are higher propagate upward as airspace risk levels 120 at an angle that corresponds to the glide profile 210, the aircraft parameter 122, or both.

Figure 3:
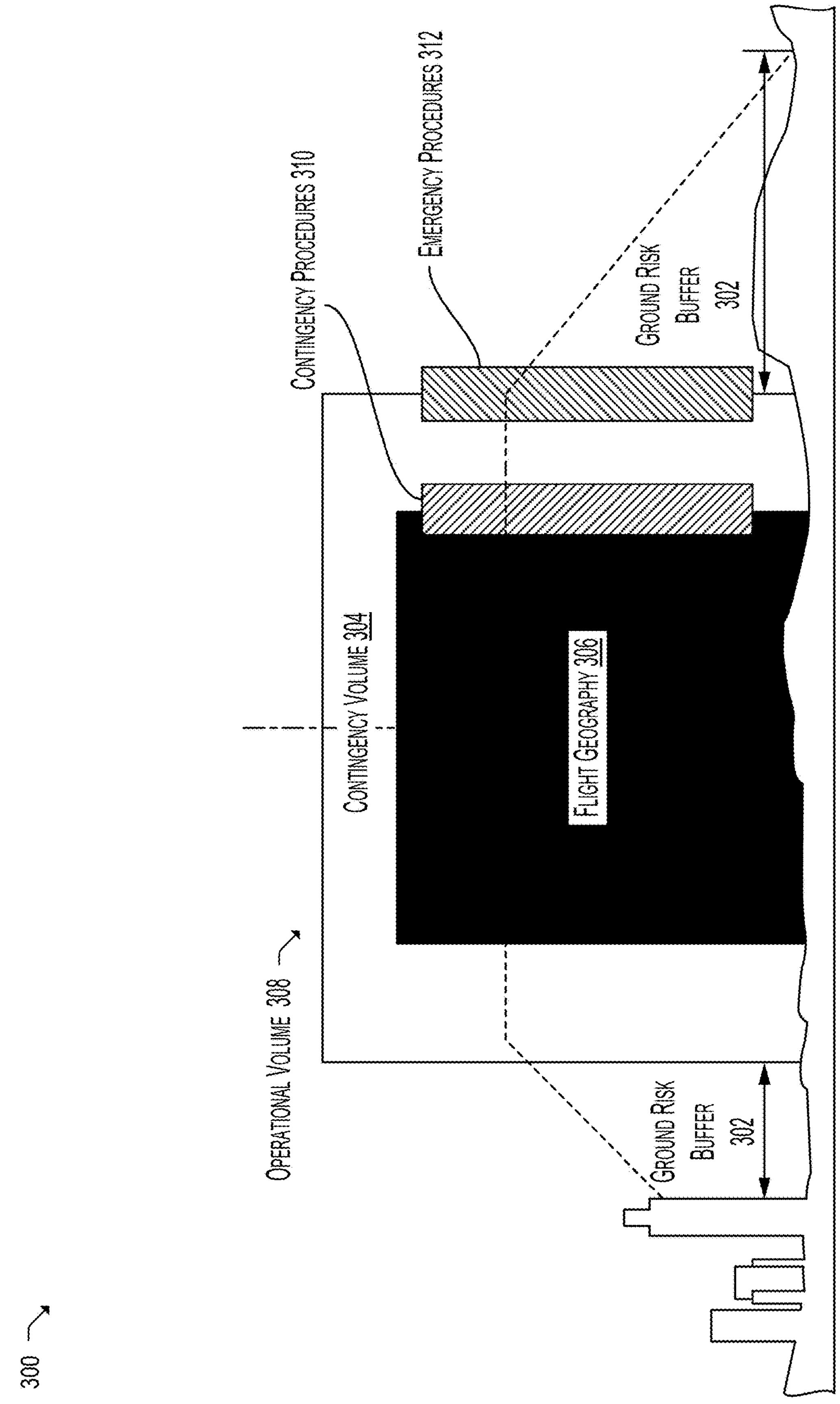
FIG. 3 is a diagram of an illustrative example of using one or more buffers to generate a flight plan based on airspace risk levels that may be performed by the system of FIG. 1.

FIG. 3 is a diagram 300 of an illustrative example of using one or more buffers 302 to generate a flight plan 128 based on airspace risk levels 120 that may be performed by the system 100 of FIG. 1. In a particular aspect, one or more operations described with reference to FIG. 3 may be performed by the flight plan generator 136, the processor(s) 116, the device 102, the system 100 of FIG. 1, or a combination thereof.

The diagram 300 includes an operational volume 308 that includes a contingency volume 304 and a flight geography 306. The operational volume 308 refers to a minimum three-dimensional space for the aircraft 134 to execute the flight path 130 safely and efficiently. The operational volume 308 accounts for performance, maneuvering characteristics, safety margins, operational procedures, or a combination thereof, of the aircraft 134. The contingency volume 304 is a three-dimensional space that serves as a buffer zone in case of unforeseen events, such as emergencies, deviations from the flight path 130, or equipment malfunctions. The flight geography 306 denotes the flight path 130 that the aircraft 134 follows within the operational volume 308. In a particular implementation, the flight plan generator 136 determines the flight path 130 based on the airspace risk levels 120 to reduce (e.g., minimize) an overall flight risk associated with the operational volume 308 of the selected flight path 130. In some implementations, the flight plan generator 136 determines the flight path 130 further based on various factors, such as detected weather conditions, predicted weather conditions, airspace restrictions, detected airspace traffic, predicted airspace traffic, or a combination thereof.

Optionally, in some implementations, the flight plan generator 136 determines the flight path 130 to incorporate ground risk buffers 302 that provide safety beyond the considerations of the operational volume 308 and the contingency volume 304. For example, even if the aircraft 134 deviates unexpectedly within the operational volume 308 or loses control, the aircraft 134 is likely to remain within the ground risk buffers 302. In some aspects, a size of the ground risk buffers 302 is based on the aircraft parameters 122, ground risk levels 108, or both.

In some aspects, the aircraft 134 (e.g., a pilot or autopilot) may initiate contingency procedures 310 to address anticipated issues within the flight geography 306 and to maintain normal flight operations of the aircraft 134. For example, the contingency procedures 310 can include adjusting the flight path 130 due to weather changes, airspace restrictions, minor equipment malfunctions, medical emergencies onboard the aircraft 134, and so forth.

In some aspects, the aircraft 134 (e.g., a pilot or autopilot) may initiate emergency procedures 312 to safely land the aircraft 134 even if the flight geography 306 has to be deviated from or the contingency volume 304 has to be breached. The emergency procedures 312 can include responding to major equipment failures or in-flight emergencies, diverting to an alternate airport due to severe weather or airspace issues, executing emergency landings in unforeseen circumstances, and so forth.

The flight plan generator 136 generates the flight plan 128 based on the ground risk levels 108, the airspace risk levels, 120, the ground risk buffers 302, or a combination thereof. The flight plan 128 indicates a flight path 130 and optionally indicates the operational volume 308, the contingency volume 304, the flight geography 306, or a combination thereof, associated with the flight path 130. In some implementations, the flight plan 128 further indicates the contingency procedures 310, the emergency procedures 312, or both.

Figure 4:
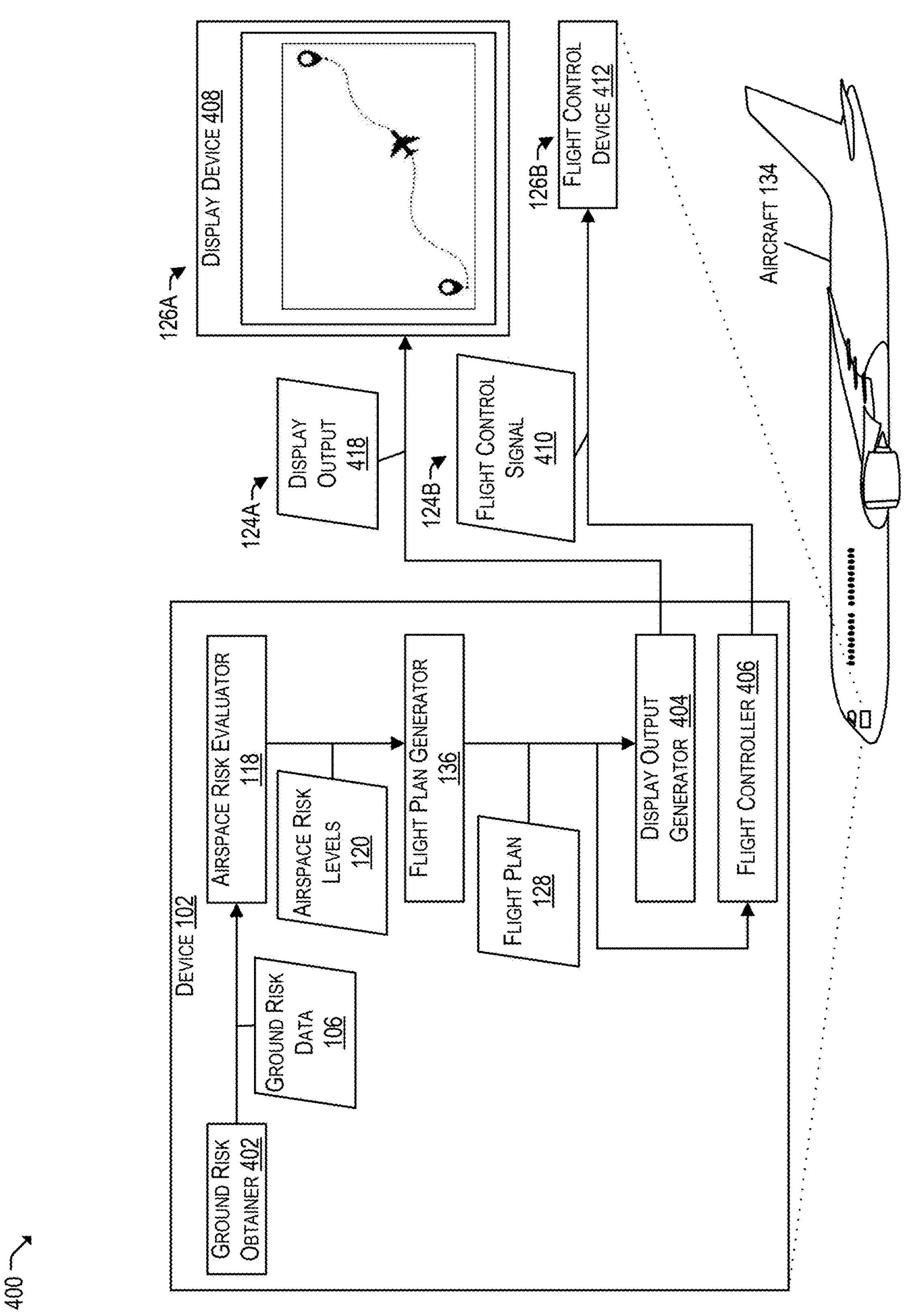
FIG. 4 depicts another example of a system configured to determine ground risk levels and airspace risk levels to provide a flight plan for an aircraft.

FIG. 4 depicts an example of a system 400 configured to determine ground risk levels 108 and airspace risk levels 120 to provide a flight plan 128 for an aircraft 134. The system 400 includes the aircraft 134 with the device 102, a display device 408, and a flight control device 412 on-board (e.g., integrated in) the aircraft 134.

The device 102 includes a ground risk obtainer 402 coupled via the airspace risk evaluator 118 to the flight plan generator 136. In some aspects, the flight plan generator 136 is coupled to a display output generator 404 that is coupled to the display device 408. In some aspects, the flight plan generator 136 is coupled to a flight controller 406 that is coupled to the flight control device 412.

The ground risk obtainer 402 is configured to obtain ground risk data 106 indicating ground risk levels 108 of terrain 110. In some aspects, the ground risk obtainer 402 obtains the ground risk data 106 prior to a flight, during the flight, or both, of the aircraft 134. In an example, the ground risk obtainer 402 obtains the ground risk data 106 in response to a user request (e.g., from ground crew or a pilot of the aircraft 134) to determine airspace risk levels 120 of an airspace 112. To illustrate, the ground risk obtainer 402, in response to receiving a user input indicating a starting location (e.g., a source or a first way point) of a flight plan 128 and an end location (e.g., a destination or a second way point) of the flight plan 128, obtains the ground risk data 106 of the terrain 110 under the airspace 112 that is between the starting location and the end location.

The ground risk obtainer 402 can retrieve the ground risk data 106 from the memory 104, a ground device, network device, or a combination thereof. In some implementations, the ground risk obtainer 402 has access to sets of ground risk data associated with geographical regions and retrieves the ground risk data 106 corresponding to the terrain 110. In some implementations, the ground risk obtainer 402 has access to ground attributes (e.g., relatively fixed ground attributes, dynamic ground attributes, or both) of the terrain 110 and generates (or updates) the ground risk data 106 based on the ground attributes. For example, the ground risk obtainer 402 updates, during the flight, the ground risk data 106 based on time, detected conditions (e.g., occupancy), event information (e.g., ground traffic), or a combination thereof. The ground risk obtainer 402 provides the ground risk data 106 to the airspace risk evaluator 118.

The airspace risk evaluator 118 is configured to generate the airspace risk levels 120 based on the ground risk levels 108 indicated by the ground risk data 106, as described with reference to FIGS. 1 and 2A-2D. The airspace risk evaluator 118 provides the airspace risk levels 120 to a flight plan generator 136. In some implementations, the flight plan generator 136 also obtains the ground risk data 106 from the ground risk obtainer 402, the airspace risk evaluator 118, or both.

The flight plan generator 136 generates a flight plan 128 based at least in part on the airspace risk levels 120 including a flight path 130 that traverses one or more portions of the airspace 112 from the starting location to the end location of the flight plan 128, as described with reference to FIGS. 1 and 3. In an example, the flight path 130 traverses airspace portions that have an airspace risk level below a risk level threshold (e.g., 6), while avoiding airspace portions that have an airspace risk level greater than the risk level threshold. The flight plan generator 136 sends the flight plan 128 to the display output generator 404, the flight controller 406, or both.

The display output generator 404 is configured to generate a display output 418 (e.g., an output 124A) based on the flight plan 128. The display output generator 404 sends the display output 418 to the display device 408 (e.g., a device 126A). The display device 408 displays a visual representation of the flight path 130. In some aspects, the display device 408 may also display the representation 132 of the aircraft 134. In some examples, the display output 418 corresponds to the output 124 of FIG. 1 and the display device 408 corresponds to the device 126 of FIG. 1.

In some implementations, the flight plan generator 136 receives a user input from a user (e.g., a pilot) responsive to the display device 408 displaying the visual representation of the flight path 130. For example, the user input may indicate approval of the flight plan 128 with any updates to the flight plan 128. In these implementations, the flight plan generator 136 may selectively provide the flight plan 128 (e.g., an updated version of the flight plan 128) to the flight controller 406 in response to determining that the user input indicates approval.

The flight controller 406 is configured to provide a flight control signal 410 (e.g., an output 124B) to the flight control device 412 (e.g., a device 126B) to navigate the aircraft 134 along the flight path 130 indicated by the flight plan 128. In some aspects, the flight control device 412 includes one or more actuators (e.g., servo motors or hydraulic systems) and the flight control signal 410 corresponds to electrical signals or commands suitable to operate the one or more actuators. For example, the flight control signal 410 causes the flight control device 412 (e.g., the one or more actuators) to move one or more control surfaces, such as ailerons, elevators, and a rudder, to cause the aircraft 134 to approximately follow the flight path 130. In some examples, the flight control signal 410 corresponds to the output 124 of FIG. 1 and the flight control device 412 corresponds to the device 126 of FIG. 1.

Although the device 102 is illustrated as including both the display output generator 404 and the flight controller 406, in some implementations the device 102 can include one of the display output generator 404 or the flight controller 406 and not the other. In an example in which the device 102 includes the display output generator 404 and not the flight controller 406, a pilot may provide user input to cause the flight control device 412 to navigate the aircraft 134 to approximately follow the flight path 130 displayed by the display device 408. In an example in which the device 102 includes the flight controller 406 and not the display output generator 404, the flight controller 406 (e.g., during an autopilot mode) may provide the flight control signal 410 to the flight control device 412 independently of user input.

A technical advantage of having the airspace risk evaluator 118 on-board the aircraft 134 can include the airspace risk evaluator 118 continuously assessing risk based on the aircraft 134 real-time position, flight path, sensor data (e.g., weather radar), or a combination thereof. This enables the airspace risk evaluator 118 to be more dynamic and accurate in airspace risk level evaluation compared to pre-flight assessments or ground-based updates. Additionally, by continuously evaluating risks, the airspace risk evaluator 118 can prompt alerts, suggest one or more alternate flight plans to avoid high-risk airspace portions detected by onboard sensors, such as sudden wind shear or unexpected turbulence.

Figure 5:
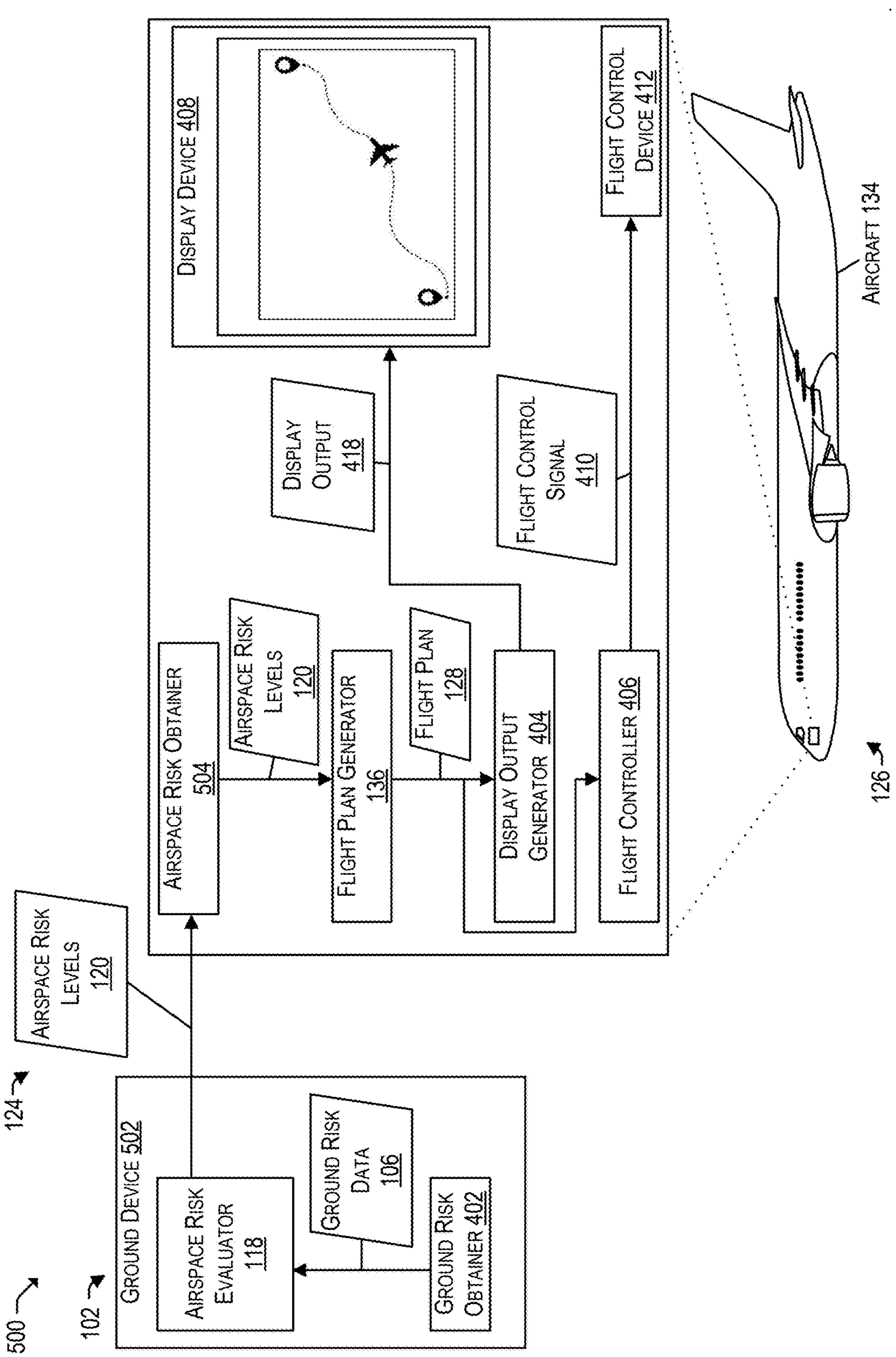
FIG. 5 depicts another example of a system configured to determine ground risk levels and airspace risk levels to provide a flight plan for an aircraft.

FIG. 5 depicts an example of a system 500 configured to determine ground risk levels 108 and airspace risk levels 120 to provide a flight plan 128 for an aircraft 134. The system 500 includes a ground device 502 configured to be communicatively coupled to the aircraft 134. In a particular aspect, the ground device 502 corresponds to the device 102 of FIG. 1, and the aircraft 134 corresponds to the device 126 of FIG. 1.

The ground device 502 includes the ground risk obtainer 402 coupled to the airspace risk evaluator 118. The aircraft 134 includes an airspace risk obtainer 504 coupled to the flight plan generator 136. In some aspects, the flight plan generator 136 is coupled to the display output generator 404 that is coupled to the display device 408. In some aspects, the flight plan generator 136 is coupled to the flight controller 406 that is coupled to the flight control device 412.

The ground risk obtainer 402 and the airspace risk evaluator 118 perform one or more operations described with reference to FIGS. 1 and 4. For example, the ground risk obtainer 402 obtains ground risk data 106 indicating ground risk levels 108 of terrain 110 under an airspace 112, and the airspace risk evaluator 118 generates the airspace risk levels 120 based on the ground risk levels 108, as described in FIGS. 1, 2A-2D, and 4.

The ground device 502 (e.g., airspace risk evaluator 118) sends the airspace risk levels 120 to the aircraft 134. In some implementations, the ground device 502 also sends the ground risk levels 108 to the aircraft 134. In some aspects, the ground device 502 sends the airspace risk levels 120 prior to a flight, during the flight, or both, to the aircraft 134. For example, the ground device 502 sends the airspace risk levels 120 to the aircraft 134 prior to a flight and sends updates to the airspace risk levels 120 to the aircraft 134 during the flight. In another example, the ground device 502, based on determining that the aircraft 134 is within a range of the ground device 502 during a flight, sends airspace risk levels 120 associated with a subsequent portion of the flight to the aircraft 134.

The airspace risk obtainer 504 retrieves the airspace risk levels 120 received from the ground device 502 and provides the airspace risk levels 120 to the flight plan generator 136. In some implementations, the airspace risk obtainer 504 also provides the ground risk data 106 to the flight plan generator 136. The flight plan generator 136, the display output generator 404, the display device 408, the flight controller 406, the flight control device 412, or a combination thereof, perform one or more operations described with reference to FIG. 4. In a particular aspect, the airspace risk levels 120 correspond to the output 124 of FIG. 1, the ground device 502 corresponds to the device 102 of FIG. 1, and the aircraft 134 corresponds to the device 126 of FIG. 1.

A technical advantage of having the airspace risk evaluator 118 at the ground device 502 and providing the airspace risk levels 120 from the ground device 502 to the aircraft 134 can include consolidated risk assessment. A ground-based airspace risk evaluator 118 can leverage a vast amount of data from multiple sources, including weather forecasting systems, real-time air traffic information, terrain databases, historical flight path data, or a combination thereof. This enables a more comprehensive and centralized risk assessment across the entire airspace. Another technical advantage includes scalability and efficiency as a ground-based airspace risk evaluator 118 can be readily scaled to accommodate a large number of aircraft operating within the airspace. Additionally, processing power and data storage capacity can be efficiently managed and upgraded at a central location.

Figure 6:
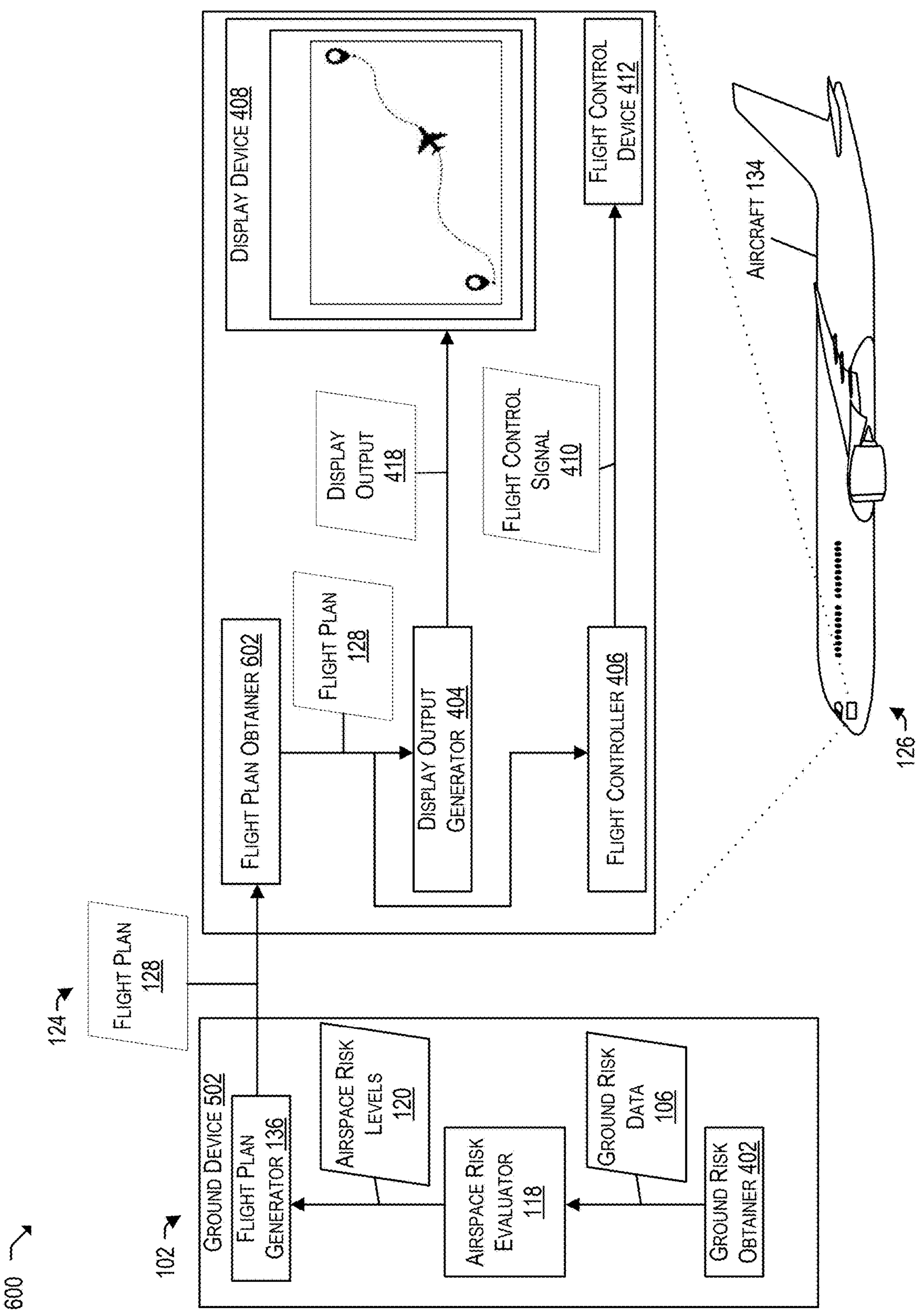
FIG. 6 depicts another example of a system configured to determine ground risk levels and airspace risk levels to provide a flight plan for an aircraft.

FIG. 6 depicts an example of a system 600 configured to determine ground risk levels 108 and airspace risk levels 120 to provide a flight plan 128 for an aircraft 134. The system 600 includes a ground device 502 configured to be communicatively coupled to the aircraft 134. In a particular aspect, the ground device 502 corresponds to the device 102 of FIG. 1, and the aircraft 134 corresponds to the device 126 of FIG. 1.

The ground device 502 includes the ground risk obtainer 402 coupled via the airspace risk evaluator 118 to the flight plan generator 136. The aircraft 134 includes a flight plan obtainer 602. In some aspects, the flight plan obtainer 602 is coupled to the display output generator 404 that is coupled to the display device 408. In some aspects, the flight plan obtainer 602 is coupled to the flight controller 406 that is coupled to the flight control device 412.

The ground risk obtainer 402, the airspace risk evaluator 118, and the flight plan generator 136 perform one or more operations described with reference to FIGS. 1, 4 and 5. For example, the ground risk obtainer 402 obtains ground risk data 106 indicating ground risk levels 108 of terrain 110 under an airspace 112, the airspace risk evaluator 118 generates the airspace risk levels 120 based on the ground risk levels 108, and the flight plan generator 136 generates the flight plan 128 based on the ground risk levels 108, the airspace risk levels 120, or both, as described in FIGS. 1-5. In some aspects, the flight plan 128 corresponds to the output 124 of FIG. 1.

The ground device 502 (e.g., the flight plan generator 136) sends the flight plan 128 to the aircraft 134. In some aspects, the flight plan obtainer 602 retrieves the flight plan 128 received from the ground device 502 and provides the flight plan 128 to the display output generator 404, the flight controller 406, or both. The display output generator 404, the display device 408, the flight controller 406, the flight control device 412, or a combination thereof, perform one or more operations described with reference to FIGS. 4 and 5.

A technical advantage of having the airspace risk evaluator 118 and the flight plan generator 136 at the ground device 502 and providing the flight plan 128 from the ground device 502 to the aircraft 134 can include a centralized data management and processing system. A ground-based system can leverage a vast amount of data from various sources, such as weather forecasting systems, real-time air traffic information, terrain databases, and historical flight path data, or a combination thereof. This enables a more comprehensive and centralized risk assessment across the entire airspace. Another technical advantage includes sophisticated risk modeling and flight plan optimization. A ground-based system has the processing power to enable the airspace risk evaluator 118 to run complex risk models that incorporate dynamic ground attributes, such as detected weather conditions, predicted weather conditions, a scheduled event, a detected event, detected ground traffic, predicted ground traffic, detected people, and so forth. This enables the flight plan generator 136 to create flight paths that avoid not only high-risk areas but also areas with potential future risks. In some implementations, communicating the flight plan 128 (e.g., data that includes waypoints, altitude commands, and any additional control parameters) to the aircraft 134 can enable the aircraft 134 (e.g., an unmanned aerial vehicle) to autonomously execute the flight plan 128.

Figure 7:
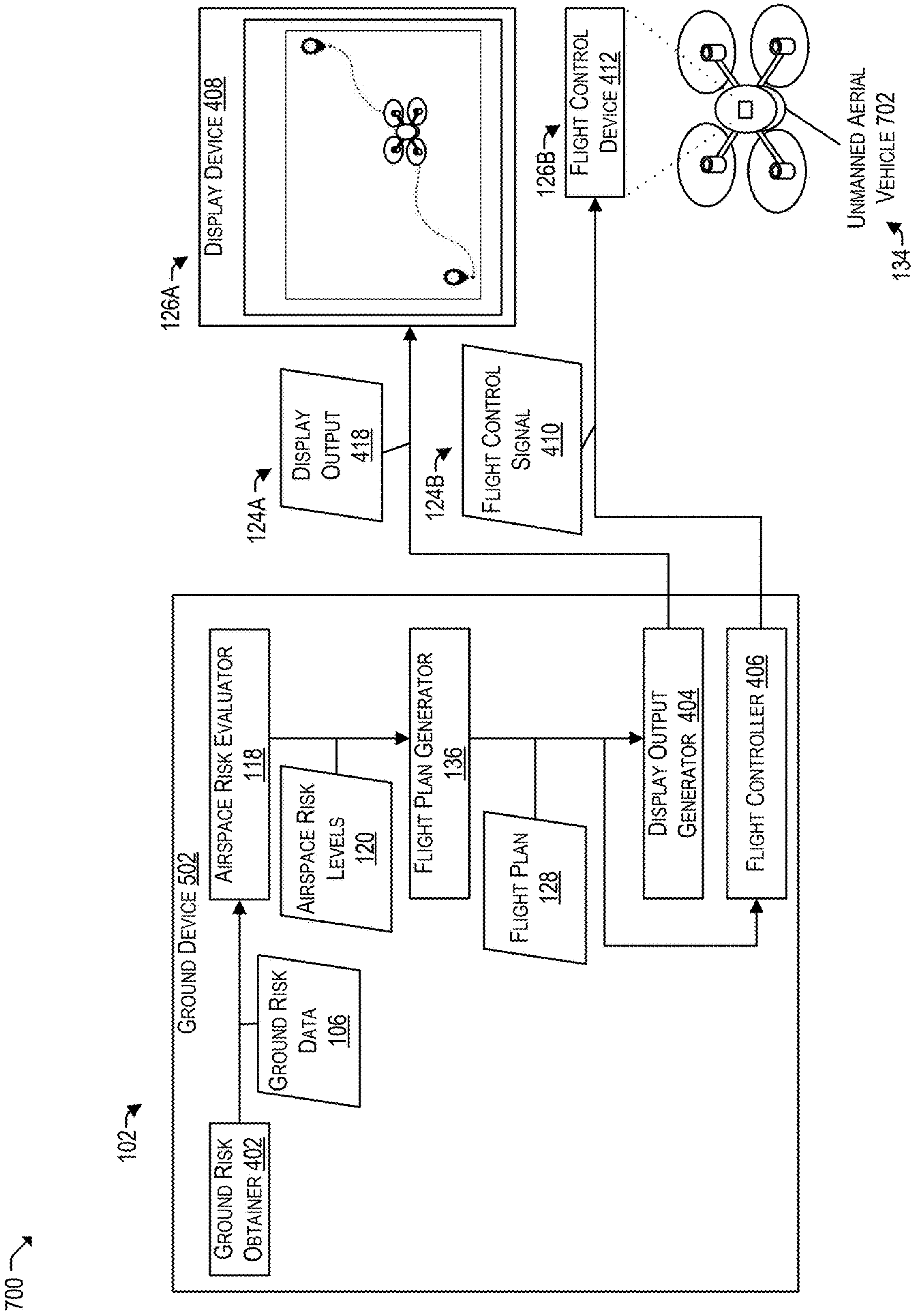
FIG. 7 depicts another example of a system configured to determine ground risk levels and airspace risk levels to provide a flight plan for an unmanned aerial vehicle.

FIG. 7 depicts an example of a system 700 configured to determine ground risk levels 108 and airspace risk levels 120 to provide a flight plan 128 for an aircraft 134 (e.g., an unmanned aerial vehicle 702). It should be understood that particular types of aircraft are provided as illustrative examples of the aircraft 134, in other examples the aircraft 134 can be include any type of aircraft, such as an airplane, a helicopter, a drone, a flying car, a piloted aircraft, an autonomous aircraft, a semi-autonomous aircraft, etc.

The system 700 includes a ground device 502 configured to be communicatively coupled to the unmanned aerial vehicle 702. The ground device 502 includes the ground risk obtainer 402 coupled via the airspace risk evaluator 118 to the flight plan generator 136. In some implementations, the flight plan generator 136 is coupled to the display output generator 404 that is communicatively coupled to the display device 408. In some aspects, the ground device 502 corresponds to the device 102 of FIG. 1 and the display device 408 corresponds to the device 126 of FIG. 1. In some implementations, the flight plan generator 136 is coupled to the flight controller 406 that is communicatively coupled to the flight control device 412. The flight control device 412 is coupled to (e.g., integrated in) the unmanned aerial vehicle 702. In some aspects, the ground device 502 corresponds to the device 102 of FIG. 1 and the flight control device 412 corresponds to the device 126 of FIG. 1.

The ground risk obtainer 402, the airspace risk evaluator 118, the flight plan generator 136, the display output generator 404, the display device 408, the flight controller 406, and the flight control device 412 perform one or more operations described with reference to FIGS. 1-6. For example, the ground risk obtainer 402 obtains ground risk data 106 indicating ground risk levels 108 of terrain 110 under an airspace 112, the airspace risk evaluator 118 generates the airspace risk levels 120 based on the ground risk levels 108, and the flight plan generator 136 generates the flight plan 128 based on the ground risk levels 108, the airspace risk levels 120, or both, as described in FIGS. 1-5.

The display output generator 404, the display device 408, the flight controller 406, the flight control device 412, or a combination thereof, perform one or more operations described with reference to FIGS. 4-6. For example, the display output generator 404 provides the display output 418 to the display device 408. To illustrate, the display device 408 corresponds to user device of a user and displays a representation of the flight plan 128 to the user. In some aspects, the display output 418 corresponds to the output 124 of FIG. 1 and the display device 408 corresponds to the device 126 of FIG. 1. In another example, the flight controller 406 provides the flight control signal 410 to the flight control device 412. To illustrate, the flight control signal 410 causes the flight control device 412 (e.g., one or more actuators) to move one or more control surfaces, such as ailerons, elevators, and a rudder, to cause the unmanned aerial vehicle 702 to approximately follow the flight path 130. In some aspects, the flight control signal 410 corresponds to the output 124 of FIG. 1 and the unmanned aerial vehicle 702 corresponds to the device 126 of FIG. 1.

A technical advantage of having the display output generator 404 at the ground device 502 and the ground device 502 providing the display output 418 to the display device 408 can include enabling an operator of the unmanned aerial vehicle 702 to view the flight plan 128 prior to the unmanned aerial vehicle 702 executing it. A technical advantage of having the flight controller 406 at the ground device 502 and the ground device 502 providing the flight control signal 410 to the unmanned aerial vehicle 702 can include remotely piloting the unmanned aerial vehicle 702 to follow the flight plan 128.

Figure 8:
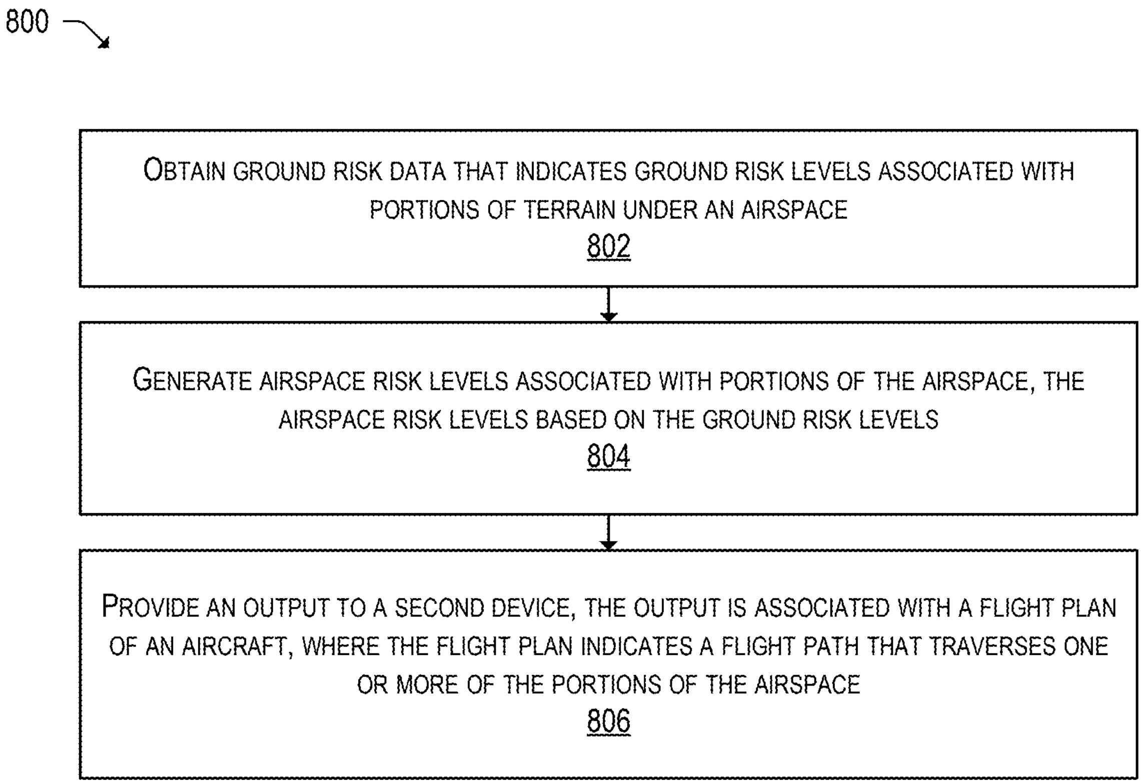
FIG. 8 is a flow chart of an example of a method of generating airspace risk levels associated with portions of the airspace and providing a flight plan indicating a flight path that traverses one or more of the portions of the airspace.

FIG. 8 is a flow chart of an example of a method 800 of generating airspace risk levels 120 associated with portions (e.g., airspace portions 202) of the airspace 112 and providing a flight plan 128 indicating a flight path 130 that traverses one or more of the portions of the airspace 112. In a particular aspect, one or more operations of the method 800 are performed at the airspace risk evaluator 118, the flight plan generator 136, the processor(s) 116, the device 102, the device 126, the aircraft 134, the system 100 of FIG. 1, the ground risk obtainer 402, the display output generator 404, the flight controller 406, the system 400 of FIG. 4, the airspace risk obtainer 504, the system 500 of FIG. 5, the flight plan obtainer 602, the system 600 of FIG. 6, the unmanned aerial vehicle 702, the system 700 of FIG. 7, or a combination thereof.

The method 800 includes, at block 802, obtaining ground risk data that indicates ground risk levels associated with portions of terrain under an airspace. For example, the airspace risk evaluator 118 obtains the ground risk data 106 that indicates the ground risk levels 108 associated with terrain portions 206 of the terrain 110 under the airspace 112, as described with reference to FIGS. 1 and 2A. In a particular aspect, the airspace risk evaluator 118 obtains the ground risk data 106 in response to a user request to determine airspace risk levels 120. To illustrate, the airspace risk evaluator 118, in response to receiving a user input indicating a starting location (e.g., a source or a first way point) of a flight plan 128 and an end location (e.g., a destination or a second way point) of the flight plan 128, obtains the ground risk data 106 of the terrain 110 under the airspace 112 that is between the starting location and the end location.

A ground risk level 108 of a terrain portion 206 can range from a first value (e.g., 1) representing a low risk to a second value (e.g., 10) representing a high risk. A ground risk level 108 of a terrain portion 206 can be based on relatively fixed ground attributes of the terrain portion 206, such as population density, a weapon system location, restricted terrain categorization, and so forth. In some implementations, a ground risk level 108 of a terrain portion 206 can be based on dynamic ground attributes, such as detected occupancy, a scheduled event, a detected event, detected ground traffic, predicted ground traffic, detected people, and so forth.

The method 800 includes, at block 804, generating airspace risk levels associated with portions of the airspace, the airspace risk levels based on the ground risk levels. For example, the airspace risk evaluator 118 generates the airspace risk levels 120 associated with the airspace portions 202 of the airspace 112 based on the ground risk levels 108, as described in FIGS. 1 and 2B-2D.

The method 800 includes, at block 806, providing an output to a second device, the output is associated with a flight plan of an aircraft, where the flight plan indicates a flight path that traverses one or more of the portion of the airspace. For example, the airspace risk evaluator 118 provides the output 124 to the device 126, as described with reference to FIGS. 1 and 4-7. The output 124 is associated with a flight plan 128 of the aircraft 134. The flight plan 128 indicates the flight path 130 that traverses one or more of the airspace portions 202. In a particular example, the output 124 includes a display output 418 that corresponds to a representation of the flight path 130 of the flight plan 128, as described with reference to FIGS. 4 and 7. In a particular example, the output 124 includes a flight control signal 410 that activates a flight control device 412 to navigate the aircraft 134 to approximately follow the flight path 130 of the flight plan 128, as described with reference to FIGS. 4 and 7. In a particular example, the output 124 includes the airspace risk levels 120 that can be used to generate the flight plan 128, as described with reference to FIG. 5. In a particular example, the output 124 includes the flight plan 128, as described with reference to FIG. 6.

The method 800 thus enables efficiently determining the airspace risk levels 120 that consider the ground risk levels 108 associated with various ground attributes of the terrain 110. The airspace risk levels 120 can be used to quickly determine low risk flight plans.

FIG. 9 is a block diagram of a computing environment 900 including a computing device 910 configured to support aspects of computer-implemented methods and computer-executable program instructions (or code) according to the present disclosure. For example, the computing device 910, or portions thereof, is configured to execute instructions to initiate, perform, or control one or more operations described with reference to FIGS. 1-8.

The computing device 910 includes one or more processors 920. In some aspects, the processor(s) 920 correspond to the processor(s) 116 of FIG. 1. The processor(s) 920 are configured to communicate with system memory 930, one or more storage devices 940, one or more input/output interfaces 950, one or more communications interfaces 960, or any combination thereof. The system memory 930 includes volatile memory devices (e.g., random access memory (RAM) devices), nonvolatile memory devices (e.g., read-only memory (ROM) devices, programmable read-only memory, and flash memory), or both. The system memory 930 stores an operating system 932, which may include a basic input/output system for booting the computing device 910 as well as a full operating system to enable the computing device 910 to interact with users, other programs, and other devices. The system memory 930 stores system program data 936, such as any data used or generated by the system 100, the device 102, the device 126, the aircraft 134, the airspace risk evaluator 118, the ground risk obtainer 402, the display output generator 404, the flight controller 406, the display device 408, the flight control device 412, the system 400, the flight plan generator 136, the airspace risk obtainer 504, the ground device 502, the system 500, the flight plan obtainer 602, the system 600, one or more modules, one or more machine learning models, or a combination thereof, as described with reference to FIGS. 1-8.

The system memory 930 includes one or more applications 934 (e.g., sets of instructions) executable by the processor(s) 920. As an example, the one or more applications 934 include instructions executable by the processor(s) 920 to initiate, control, or perform one or more operations described with reference to FIGS. 1-8. To illustrate, the one or more applications 934 include instructions executable by the processor(s) 920 to initiate, control, or perform one or more operations described with reference to the airspace risk evaluator 118, the ground risk obtainer 402, the display output generator 404, the flight controller 406, the flight plan generator 136, the airspace risk obtainer 504, the flight plan obtainer 602 or a combination thereof.

In a particular implementation, the system memory 930 includes a non-transitory, computer readable medium storing the instructions that, when executed by the processor(s) 920, cause the processor(s) 920 to initiate, perform, or control operations to aid in generating airspace risk levels 120 associated with airspace portions 202 of the airspace 112 and providing a flight plan 128 indicating the flight path 130 that traverses one or more of the airspace portion 202 of the airspace 112. For example, the instructions, when executed by the processor(s) 920, cause the processor(s) 920 to obtain ground risk data (e.g., ground risk data 106) that indicates ground risk levels (e.g., ground risk levels 108) associated with portions (e.g., terrain portions 206) of terrain (e.g., a terrain 110) under an airspace (e.g., an airspace 112), generate airspace risk levels (e.g., airspace risk levels 120) associated with portions (e.g., airspace portions 202) of the airspace, the airspace risk levels based on the ground risk levels, and provide an output (e.g., an output 124) to a device (e.g., a device 126), the output associated with a flight plan (e.g., flight plan 128) of an aircraft (e.g., an aircraft 134), wherein the flight plan indicates a flight path (e.g., a flight path 130) that traverses one or more of the portions of the airspace.

The one or more storage devices 940 include nonvolatile storage devices, such as magnetic disks, optical disks, or flash memory devices. In a particular example, the storage devices 940 include both removable and non-removable memory devices. The storage devices 940 are configured to store an operating system, images of operating systems, applications (e.g., one or more of the applications 934), and program data (e.g., the program data 936). In a particular aspect, the system memory 930, the storage devices 940, or both, include tangible computer-readable media. In a particular aspect, one or more of the storage devices 940 are external to the computing device 910. In some aspects, the system memory 930, the storage devices 940, or both, correspond to the memory 104 of FIG. 1.

The one or more input/output interfaces 950 enable the computing device 910 to communicate with one or more input/output devices 970 to facilitate user interaction. For example, the one or more input/output interfaces 950 can include a display interface, an input interface, or both. For example, the input/output interface 950 is adapted to receive input from a user, to receive input from another computing device, or a combination thereof. In some implementations, the input/output interface 950 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 970 includes one or more user interface devices and displays (e.g., device 126), the display device 408, including some combination of buttons, keyboards, pointing devices, displays, speakers, microphones, touch screens, and other devices.

The processor(s) 920 are configured to communicate with devices or controllers 980 via the one or more communications interfaces 960. For example, the one or more communications interfaces 960 can include a network interface. The devices or controllers 980 can include, for example, the flight control device 412, the device 126, or both.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-8. In some implementations, part, or all of one or more of the operations or methods of FIGS. 1-8 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

Particular Aspects of the Disclosure are Described Below in Sets of Interrelated Examples:

According to Example 1, a device includes a processor configured to: obtain ground risk data that indicates ground risk levels associated with portions of terrain under an airspace; generate airspace risk levels associated with portions of the airspace, the airspace risk levels based on the ground risk levels; and provide an output to a second device, the output associated with a flight plan of an aircraft, wherein the flight plan indicates a flight path that traverses one or more of the portions of the airspace.

Example 2 includes the device of Example 1, wherein the processor is further configured to generate a first airspace risk level of a first portion of the airspace based on at least one or more first ground risk levels of one or more first portions of the terrain, wherein the one or more first portions of the terrain are below the first portion of the airspace.

Example 3 includes the device of Example 2, wherein the processor is further configured to select the one or more first portions of the terrain based on an aircraft parameter of the aircraft.

Example 4 includes the device of any of Example 1 to Example 3, wherein the processor is further configured to generate a first airspace risk level of a first portion of the airspace based on one or more second airspace risk levels of one or more second portions of the airspace.

Example 5 includes the device of Example 4, wherein the processor is further configured to select the one or more second portions based on an aircraft parameter of the aircraft.

Example 6 includes the device of Example 5, wherein the aircraft parameter corresponds to a glide profile of the aircraft.

Example 7 includes the device of any of Example 4 to Example 6, wherein the one or more second portions of the airspace are below the first portion of the airspace.

Example 8 includes the device of any of Example 1 to Example 7, wherein the ground risk levels are based on at least one of population density, weapon system locations, restricted terrain, scheduled events, detected ground traffic, or predicted ground traffic.

Example 9 includes the device of any of Example 1 to Example 8, wherein the processor is further configured to generate the output indicating the airspace risk levels, and wherein the aircraft includes the second device.

Example 10 includes the device of any of Example 1 to Example 9, wherein the processor is further configured to generate the flight plan based on the airspace risk levels.

Example 11 includes the device of Example 10, wherein the processor is further configured to generate the flight plan based on a buffer zone, detected weather conditions, predicted weather conditions, airspace restrictions, detected airspace traffic, predicted airspace traffic, or a combination thereof.

Example 12 includes the device of any of Example 1 to Example 11, wherein the output indicates the flight plan, and wherein the second device includes the aircraft, a display device, or both.

Example 13 includes the device of any of Example 1 to Example 12, wherein the output includes a flight control signal, and the second device includes a flight control device of the aircraft.

Example 14 includes the device of any of Example 1 to Example 13, wherein the processor is integrated in the aircraft or a ground device.

Example 15 includes the device of any of Example 1 to Example 14, wherein the aircraft includes an unmanned aerial vehicle.

According to Example 16, a method includes obtaining, at a first device, ground risk data that indicates ground risk levels associated with portions of terrain under an airspace; generating, at the first device, airspace risk levels associated with portions of the airspace, the airspace risk levels based on the ground risk levels; and providing an output, from the first device to a second device, the output associated with a flight plan of an aircraft, wherein the flight plan indicates a flight path that traverses one or more of the portions of the airspace.

Example 17 includes the method of Example 16, further comprising generating a first airspace risk level of a first portion of the airspace based on at least one or more first ground risk levels of one or more first portions of the terrain, wherein the one or more first portions of the terrain are below the first portion of the airspace.

Example 18 includes the method of Example 16 or Example 17, further comprising selecting the one or more first portions of the terrain based on an aircraft parameter of the aircraft.

Example 19 includes the method of any of Example 16 to Example 18 and further includes generating a first airspace risk level of a first portion of the airspace based on one or more second airspace risk levels of one or more second portions of the airspace.

According to Example 20, a non-transitory computer-readable medium storing instructions that, when executed by one or more processors, cause the one or more processors to obtain ground risk data that indicates ground risk levels associated with portions of terrain under an airspace; generate airspace risk levels associated with portions of the airspace, the airspace risk levels based on the ground risk levels; and provide an output to a device, the output associated with a flight plan of an aircraft, wherein the flight plan indicates a flight path that traverses one or more of the portions of the airspace

What is claimed is:

1. A device comprising:

a processor configured to:

obtain ground risk data that indicates ground risk levels associated with portions of terrain under an airspace;

generate airspace risk levels associated with portions of the airspace, the airspace risk levels based on the ground risk levels, wherein the generation of the airspace risk levels comprises:

create a voxel-based data structure representing the airspace as a grid of voxel elements;

compute initial airspace risk levels for a first layer of voxel elements based on the ground risk levels of corresponding terrain portions below each voxel element; and iteratively propagate risk levels from the first layer to subsequent layers of voxel elements in a vertical direction from the terrain toward the airspace using a propagation algorithm, wherein each voxel element in a subsequent layer derives its risk level based on previously-computed risk levels of voxel elements in layers below the subsequent layer in the vertical direction from the terrain toward the airspace, wherein the propagation algorithm comprises:

for each voxel element in the subsequent layer, select multiple voxel elements from a single layer below based on an aircraft parameter; and determine the risk level of the voxel element in the subsequent layer based on a representative risk value of the selected multiple voxel elements; and provide an output to a second device, the output associated with a flight plan of an aircraft, wherein the flight plan indicates a flight path that traverses one or more of the portions of the airspace.

2. The device of claim 1, wherein, to compute the initial airspace risk levels for the first layer, the processor is configured to select, for each voxel element in the first layer, one or more terrain portions below the voxel element based on spatial correspondence between the voxel element and the terrain portions.

3. The device of claim 2, wherein the processor is configured to select the one or more terrain portions based on the aircraft parameter.

4. The device of claim 1, wherein the aircraft parameter comprises a glide profile of the aircraft, and wherein said select of the multiple voxel elements comprises select voxel elements that are within a glide range below the voxel element in the subsequent layer, the glide range determined based on the glide profile.

5. The device of claim 1, wherein the representative risk value is based on a maximum risk value of the selected multiple voxel elements.

6. The device of claim 1, wherein the aircraft parameter corresponds to a glide profile of the aircraft.

7. The device of claim 4, wherein said determine the risk level comprises propagate a highest ground risk level upward and outward through the subsequent layers at an angle corresponding to the aircraft parameter.

8. The device of claim 1, wherein the ground risk levels are based on at least one of population density, weapon system locations, restricted terrain, scheduled events, detected ground traffic, or predicted ground traffic.

9. The device of claim 1, wherein the processor is configured to generate the output indicating the airspace risk levels, and wherein the aircraft includes the second device.

10. The device of claim 1, wherein the processor is configured to generate the flight plan based on the airspace risk levels.

11. The device of claim 10, wherein the processor is configured to generate the flight plan based on a buffer zone, detected weather conditions, predicted weather conditions, airspace restrictions, detected airspace traffic, predicted airspace traffic, or a combination thereof.

12. The device of claim 1, wherein the output indicates the flight plan, and wherein the second device includes the aircraft, a display device, or both.

13. The device of claim 1, wherein the output includes a flight control signal, and the second device includes a flight control device of the aircraft.

14. The device of claim 1, wherein the processor is integrated in the aircraft or a ground device.

15. The device of claim 1, wherein the aircraft includes an unmanned aerial vehicle.

16. A method comprising:

obtaining, at a first device, ground risk data that indicates ground risk levels associated with portions of terrain under an airspace;

generating, at the first device, airspace risk levels associated with portions of the airspace, the airspace risk levels based on the ground risk levels, wherein the generating the airspace risk levels comprises:

creating a voxel-based data structure representing the airspace as a grid of voxel elements;

computing initial airspace risk levels for a first layer of voxel elements based on the ground risk levels of corresponding terrain portions below each voxel element; and iteratively propagating risk levels from the first layer to subsequent layers of voxel elements in a vertical direction from the terrain toward the airspace using a propagation algorithm, wherein each voxel element in a subsequent layer derives its risk level based on previously-computed risk levels of voxel elements in layers below the subsequent layer in the vertical direction from the terrain toward the airspace, wherein the propagation algorithm comprises:

for each voxel element in the subsequent layer, selecting multiple voxel elements from a single layer below based on an aircraft parameter; and determining the risk level of the voxel element in the subsequent layer based on a representative risk value of the selected multiple voxel elements; and providing an output from the first device to a second device, the output associated with a flight plan of an aircraft, wherein the flight plan indicates a flight path that traverses one or more of the portions of the airspace.

17. The method of claim 16, wherein said computing the initial airspace risk levels for the first layer includes selecting, for each voxel element in the first layer, one or more terrain portions below the voxel element based on spatial correspondence between the voxel element and the terrain portions.

18. The method of claim 17, wherein the one or more terrain portions are selected based on the aircraft parameter.

19. The method of claim 16, wherein the aircraft parameter comprises a glide profile of the aircraft, and wherein said selecting of the multiple voxel elements comprises selecting voxel elements that are within a glide range below the voxel element in the subsequent layer, the glide range determined based on the glide profile.

20. A non-transitory computer-readable medium storing instructions that, when executed by one or more processors, cause the one or more processors to:

obtain ground risk data that indicates ground risk levels associated with portions of terrain under an airspace;

generate airspace risk levels associated with portions of the airspace, the airspace risk levels based on the ground risk levels, wherein the generation of the airspace risk levels comprises:

create a voxel-based data structure representing the airspace as a grid of voxel elements;

compute initial airspace risk levels for a first layer of voxel elements based on the ground risk levels of corresponding terrain portions below each voxel element; and iteratively propagate risk levels from the first layer to subsequent layers of voxel elements in a vertical direction from the terrain toward the airspace using a propagation algorithm, wherein each voxel element in a subsequent layer derives its risk level based on previously-computed risk levels of voxel elements in layers below the subsequent layer in the vertical direction from the terrain toward the airspace, wherein the propagation algorithm comprises:

for each voxel element in the subsequent layer, select multiple voxel elements from a single layer below based on an aircraft parameter; and determine the risk level of the voxel element in the subsequent layer based on a representative risk value of the selected multiple voxel elements; and provide an output to a device, the output associated with a flight plan of an aircraft, wherein the flight plan indicates a flight path that traverses one or more of the portions of the airspace.

* * * * *